(12) United States Patent
Nakajima

(10) Patent No.: US 8,755,608 B2
(45) Date of Patent: Jun. 17, 2014

(54) MARKER GENERATION DEVICE, MARKER GENERATION DETECTION SYSTEM, MARKER GENERATION DETECTION DEVICE, MARKER, MARKER GENERATION METHOD, AND PROGRAM THEREFOR

(75) Inventor: Noboru Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 65 days.

(21) Appl. No.: 13/386,266

(22) PCT Filed: Jul. 22, 2010

(86) PCT No.: PCT/JP2010/062349
§ 371 (c)(1),
(2), (4) Date: Jan. 20, 2012

(87) PCT Pub. No.: WO2011/010693
PCT Pub. Date: Jan. 27, 2011

(65) Prior Publication Data
US 2012/0114253 A1   May 10, 2012

(30) Foreign Application Priority Data

Jul. 23, 2009 (JP) ................................. 2009-171837

(51) Int. Cl.
*G06K 9/46* (2006.01)
(52) U.S. Cl.
USPC ........................................................ 382/201
(58) Field of Classification Search
None
See application file for complete search history.

(56) References Cited

U.S. PATENT DOCUMENTS

2005/0234333 A1* 10/2005 Takemoto et al. ............ 600/426
2010/0104135 A1* 4/2010 Nakajima .................... 382/103

FOREIGN PATENT DOCUMENTS

| CN | 101006467 A | 7/2007 |
|---|---|---|
| JP | 2003-223639 A | 8/2003 |
| WO | 2008090908 A1 | 7/2008 |

OTHER PUBLICATIONS

Communication dated Nov. 8, 2013, issued by the State Intellectual Property Office of the People's Republic of China in corresponding Application No. 201080032765.3.
Richard Hartley, et al.; "Multiple View Geometry,", CVPR, Jun. 1999; 57 pages total.
Chi-Man Pun, et al.; "Log-Polar Wavelet Energy Signatures for Rotation and Scale Invariant Texture Classification,"; IEEE Transactions on Pattern Analysis and Machine Intelligence, vol. 25, No. 5, May 2003, pp. 590-602.
Graham Finlayson, et al.; "On the Removal of Shadows from Images,"; IEEE Transactions on Pattern Analysis and Machine Intelligence, vol. 28, No. 1, Jan. 2006, pp. 59-68.

(Continued)

Primary Examiner — Stephen R Koziol
Assistant Examiner — Delomia Gilliard
(74) Attorney, Agent, or Firm — Sughrue Mion, PLLC

(57) ABSTRACT

Provided is a marker generation device which has a measurement means, an invariant feature conversion means, a singular feature selection means, and a marker generation means. The measurement means measures a change in posture of an object in a background image on the basis of the image. The invariant feature conversion means indicates feature points extracted from the background image in an invariant feature space by means of a predetermined conversion process in accordance with the change in posture. The singular feature selection means selects, as a singular feature, a part in which the feature points are not indicated in the invariant feature space. The marker generation means generates a marker with the use of the singular feature.

12 Claims, 32 Drawing Sheets

(56) References Cited

OTHER PUBLICATIONS

Robby Tan, et al.; "Separating Reflection Components of Textured Surfaces Using a Single Image,"; IEEE Transactions on Pattern Analysis and Machine Intelligence, vol. 27, No. 2, Feb. 2005, pp. 178-193.

Thomas Breuel, et al.; "An Algorithm for Finding Maximal Whitespace Rectangles at Arbitrary Orientations for Document Layout Analysis,", Seventh International Conference on Document Analysis and Recognition, vol. 1, Aug. 3-6, 2003, pp. 66-70.

Ugo Montanari, "On the Optimal Detection of Curves in Noisy Pictures,"; Communications of the ACM, vol. 14, No. 5, May 1971, pp. 335-345.

* cited by examiner

<FEATURE POINT INFORMATION TABLE>

| A | B | C | D | E |
|---|---|---|---|---|
|  | .. | .. | .. |  |
|  | .. | .. | .. |  |
|  | 42 | x1 | y1 | EDGE, RED, BRIGHTNESS 52% |
| i-11 | .. | .. | .. |  |
|  | 67 | x2 | y2 | EDGE |
|  | .. | .. | .. |  |
|  | 73 | x3 | y3 | INTERSECTION |
|  | .. | .. | .. |  |
|  | .. | .. | .. |  |
|  | 42 | u1 | v1 | EDGE, RED, BRIGHTNESS 52% |
|  | .. | .. | .. |  |
| i-15 | 67 | u2 | v2 | EDGE |
|  | .. | .. | .. |  |
|  | 73 | u2 | v2 | INTERSECTION |
|  | .. | .. | .. |  |

A: SERIAL NUMBER OF FRAME IMAGE
B: SERIAL NUMBER OF FEATURE POINT
C: X COORDINATE OF FEATURE POINT
D: Y COORDINATE OF FEATURE POINT
E: INFORMATION RELATED TO FEATURE POINT (INVARIANT FEATURE SPACE)

(INVARIANT FEATURE SPACE)

(INVARIANT FEATURE SPACE)

(INVARIANT FEATURE SPACE)

MARKER PATTERN GENERATION SCOPE (MARKER PATTERN GENERATION SCOPE)

(UNIQUE FEATURE ARRANGEMENT DIAGRAM)

(UNIQUE FEATURE ARRANGEMENT DIAGRAM)

(MARKER)

(1)     (2)     (3)     (4)

| FREEDOM DEGREE | TRANSLATION | SCALING | ROTATION | SHEAR DEFORMATION |
|---|---|---|---|---|
| BASIS NUMBER | 1 | 2 | | 3 |

(BASIS NUMBER SETTING TABLE)

FIG. 26

(A) AFFINE TRANSFORMATION MATRIX $$\begin{pmatrix} u \\ v \end{pmatrix} = \begin{pmatrix} a & b \\ d & e \end{pmatrix} \begin{pmatrix} x \\ y \end{pmatrix} + \begin{pmatrix} c \\ f \end{pmatrix}$$

(WHERE, a-f ARE INDICATIVE OF AFFINE TRANSFORMATION COEFFICIENTS)

(B) AFFINE TRANSFORMATION COEFFICIENT TABLE

| AFFINE TRANSFORMATION COEFFICIENT \ FREEDOM DEGREE | TRANSLATION | SCALING | ROTATION | SHEAR DEFORMATION |
|---|---|---|---|---|
| a | 1 | s | $\cos\theta$ | 1 |
| b | 0 | 0 | $\sin\theta$ | $\tan\theta h$ |
| c | q | 0 | 0 | 0 |
| d | 0 | 0 | $-\sin\theta$ | $\tan\theta v$ |
| e | 1 | t | $\cos\theta$ | 1 |
| f | r | 0 | 0 | 0 |

WHERE, q AND r ARE TRANSLATION COEFFICIENTS, s AND t ARE SCALING COEFFICIENTS, θ IS ROTATIONAL ANGLE, θh IS SHEAR ANGLE TO HOROZONTAL DIRECTION, AND θv IS SHEAR ANGLE TO VERTICAL DIRECTION

FIG. 34
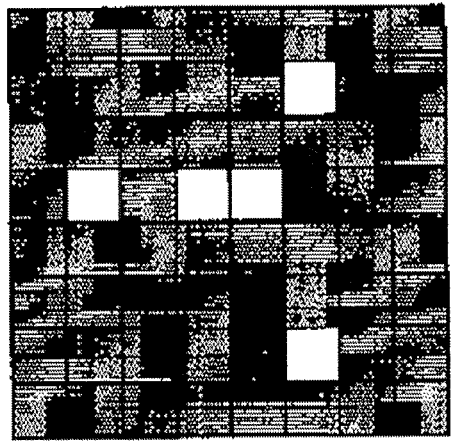
(B) WHEN NO MARKER EXISTS
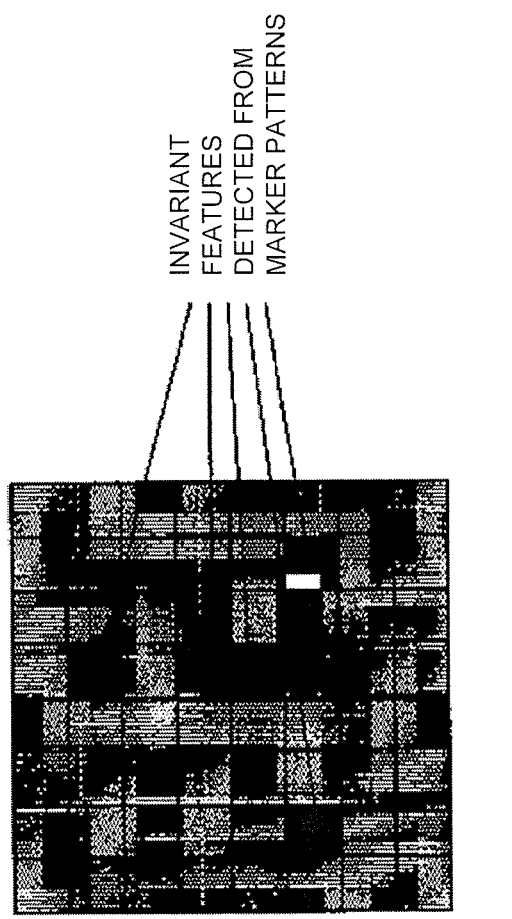
INVARIANT FEATURES DETECTED FROM MARKER PATTERNS
(A) WHEN MARKER EXISTS

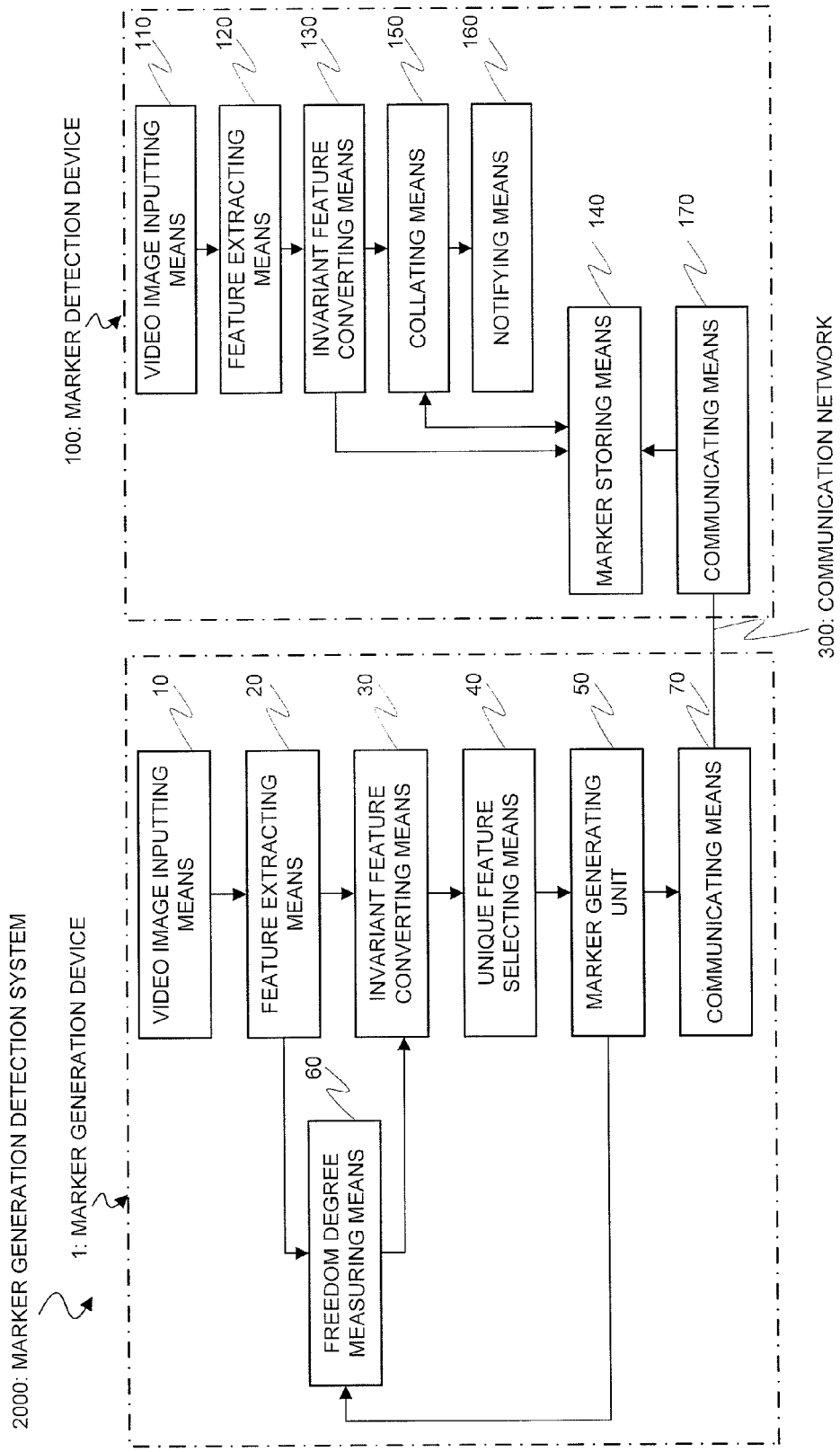

MARKER GENERATION DEVICE, MARKER GENERATION DETECTION SYSTEM, MARKER GENERATION DETECTION DEVICE, MARKER, MARKER GENERATION METHOD, AND PROGRAM THEREFOR

CROSS REFERENCE TO RELATED APPLICATIONS

This application is a National Stage of International Application No. PCT/JP2010/062349 filed Jul. 22, 2010, claiming priority based on Japan Patent Application No. 2009-171837 filed Jul. 23, 2009 the contents of all of which are incorporated herein by reference in their entirety.

TECHNICAL FIELD

The present invention relates to a marker generation device for generating a marker, a marker generation detection system provided with a marker generation function, a marker generation detection device, its marker, a marker generation method of generating its marker, and a marker generation program.

BACKGROUND ART

As a technology of identifying whether or not a desired object exists in a certain space, the marker detection method of previously adding a marker with a predetermined shape to a targeted object, and determining whether or not the targeted object exists, dependent upon existence or not of the marker in a background video image of the above space, is generally known.

For example, the technology of extracting feature points from the background video image not containing the marker, and generating the marker to be derived based on the above extracted feature points, which is comprised of image features not appearing in the background video image, is disclosed in Patent literature 1.

Specifically, when a pattern identical to the marker generated in such a method is previously added to the targeted object in a preparatory stage, and this pattern is detected from a predetermined space video image in a detection stage, it may be determined that the targeted object exists in the above space.

As it is, in a detection stage, the pattern of the marker added to the object could be varied in some cases, accompanied with a change in the environments such as a direction of a camera for imaging the above space and the like.

This causes a problem that the pattern of the marker added to the object does not match with the pattern of the marker that should be detected, and the marker cannot be detected appropriately.

Thereupon, the technology of previously storing a first geometric invariant corresponding to an object identification information code (that corresponds to the aforementioned marker) peculiar to the object for each object in the preparatory stage, acquiring the images of the object added with the object identification information code from a plurality of viewpoints in the detection stage, extracting feature point positions from a plurality of independent images produced out of these images to obtain a second geometric invariant, and detecting the first geometric invariant being the closest to this second geometric invariant, thereby to detect the corresponding object is disclosed in Patent literature 2.

That is, in accordance with such a technology, making a comparison of the object identification information based upon the invariant without depending upon a plurality of the viewpoints makes it possible to identify identity between the object identification information acquired in a certain direction and the object identification information acquired in another direction.

For this, the above-mentioned problems can be dissolved because the targeted object can be accurately detected even though the video images are acquired obliquely.

CITATION LIST

Patent Literature

PTL 1: International Publication No. WO2008/090908 (pamphlet)
PTL 2: Japanese Patent application Laid-open No. 2003-223639

SUMMARY OF INVENTION

Technical Problem

However, any technology described above cannot cope with various postural changes that could occur in the marker. For example, the marker itself is translated, rotated, scaled, or rotated, dependent upon a shape of the targeted object and its environment in some cases.

Further, optical distortion such as shear deformation might occur, dependent upon the imaging element such as a camera for performing the video image input (specially, a CMOS element for sequentially reading out the moving pictures or the like).

In addition, all of the postural changes described above might occur, dependent upon a relative positional relationship between the to-be-imaged target and the camera etc.

Thus, when various postural changes mentioned above occur, the above-described related technologies cannot detect the markers correctly, and resultantly, a problem that stability and reliability of the object detection are lacking surfaces.

The present invention has been accomplished in consideration of the above-mentioned problems, and an object thereof is to provide a marker generation device, a marker generation detection system, a marker generation detection device, a marker, a marker generation method, and a marker generation program that realize the accurate object detection while suppressing a load at the time of the marker generation/marker detection by comprehensively preventing omission of the marker detection that could cause various postural changes, and together therewith, generating the markers suitable for the kinds of the postural changes.

Solution to Problem

The present invention is a marker generation device comprising: a measuring means that measures, based upon a background image, postural changes of an object within this image; an invariant feature converting means that displays feature points extracted from said background images onto an invariant feature space with a predetermined conversion process responding to said postural changes; a unique feature selecting means that selects as a unique feature a portion of said invariant feature space in which said feature point does not appear; and a marker generating means that generates a marker by employing said unique features.

The present invention is a marker generation detection system comprising a marker generation device and a marker detection device: wherein said marker generation device comprises: a measuring means that measures, based upon a background image, postural changes of an object within this image; an invariant feature converting means that displays feature points extracted from said background images onto an invariant feature space with a predetermined conversion process responding to said postural changes; a unique feature selecting means that selects as a unique feature a portion of said invariant feature space in which said feature point does not appear; and a marker generating means that generates a marker by employing said unique features; and wherein said marker detection device comprises: a marker storing means that stores said generated markers; and a collating means that determines whether or not an arrangement of said unique feature of the marker exists in an arrangement of an invariant feature group for displaying the feature points extracted from the background images for detecting said markers onto said invariant feature space.

The present invention is a marker generation detection device comprising: a measuring means that measures, based upon a background image, postural changes of an object within this image; an invariant feature converting means that displays feature points extracted from said background images onto an invariant feature space with a predetermined conversion process responding to said postural change; a unique feature selecting means that selects as a unique feature a portion of said invariant feature space in which said feature point does not appear; and a marker generating means that generates a marker by employing said unique features; a marker storing means that stores said generated markers; and a collating means that determines whether or not an arrangement of said unique feature of the marker exists in an arrangement of an invariant feature group for displaying the feature points extracted from the background images for detecting said markers onto said invariant feature space.

The present invention is a marker generated by employing, in an invariant feature space onto which feature points of a background image are displayed with a predetermined conversion process responding to a postural change to be measured from this image, a portion in which said feature point does not appear.

The present invention is a marker generation method comprising the steps of: measuring, based upon a background image, postural changes of an object within this image; displaying feature points extracted from said background images onto an invariant feature space with a predetermined conversion process responding to said postural changes; selecting as a unique feature a portion of said invariant feature space in which said feature point does not appear; and generating a marker by employing said unique features.

The present invention is marker generation program for causing an information processing device to function as: a means that measures, based upon a background image, postural changes of an object within this image; a means that displays feature points extracted from said background images onto an invariant feature space with a predetermined conversion process responding to said postural changes; a means that selects as a unique feature a portion of said invariant feature space in which said feature point does not appear; and a means that generates a marker by employing said unique features.

Advantageous Effect of Invention

The marker generation device, the marker generation detection system, the marker generation detection device, the marker, the marker generation method, and the marker generation program of the present invention enable the accurate object detection while suppressing a load at the time of the marker generation/marker detection.

BRIEF DESCRIPTION OF DRAWINGS

FIG. 15 is a view illustrating the invariant feature space in which the segments of which the invariant feature number is one or more are filled-in.

FIG. 26 is a view for making an explanation associated with an affine transform.

FIG. 34 is an explanatory view for explaining the marker detection that is carried out with the invariant features.

FIG. 38 is a block diagram illustrating a configuration of the marker generation detection system.

DESCRIPTION OF EMBODIMENTS

Hereinafter, the preferred exemplary embodiments of the marker generation device, the marker generation detection system, the marker generation detection device, the marker, the marker generation method, and the marker generation program relating to the present invention will be explained by making a reference to the accompanied drawings.

[The First Exemplary Embodiment of the Marker Generation Device and the Marker Generation Method]

At first, the first exemplary embodiment of the marker generation device and the marker generation method of the present invention will be explained by making a reference to FIG. 1. The same figure is a block diagram illustrating a configuration of the marker generation device of this exemplary embodiment.

Figure 1:
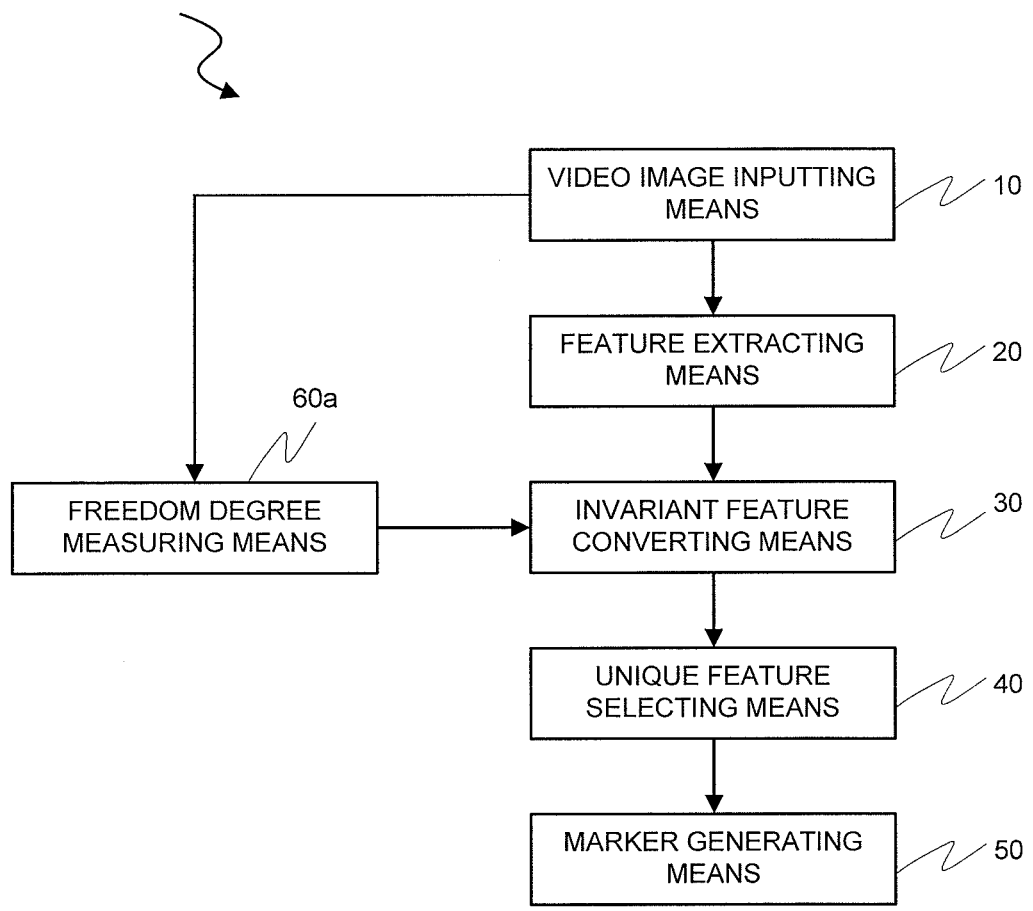
FIG. 1 is a block diagram illustrating a configuration of the marker generation device in a first exemplary embodiment of the present invention.

As shown in FIG. 1, a marker generation device 1a includes a video image inputting means 10, a feature extracting means 20, an invariant feature converting unit 30, a unique feature selecting means 40, a marker generating means 50, and a freedom degree measuring means 60a (measuring means).

Figure 2:
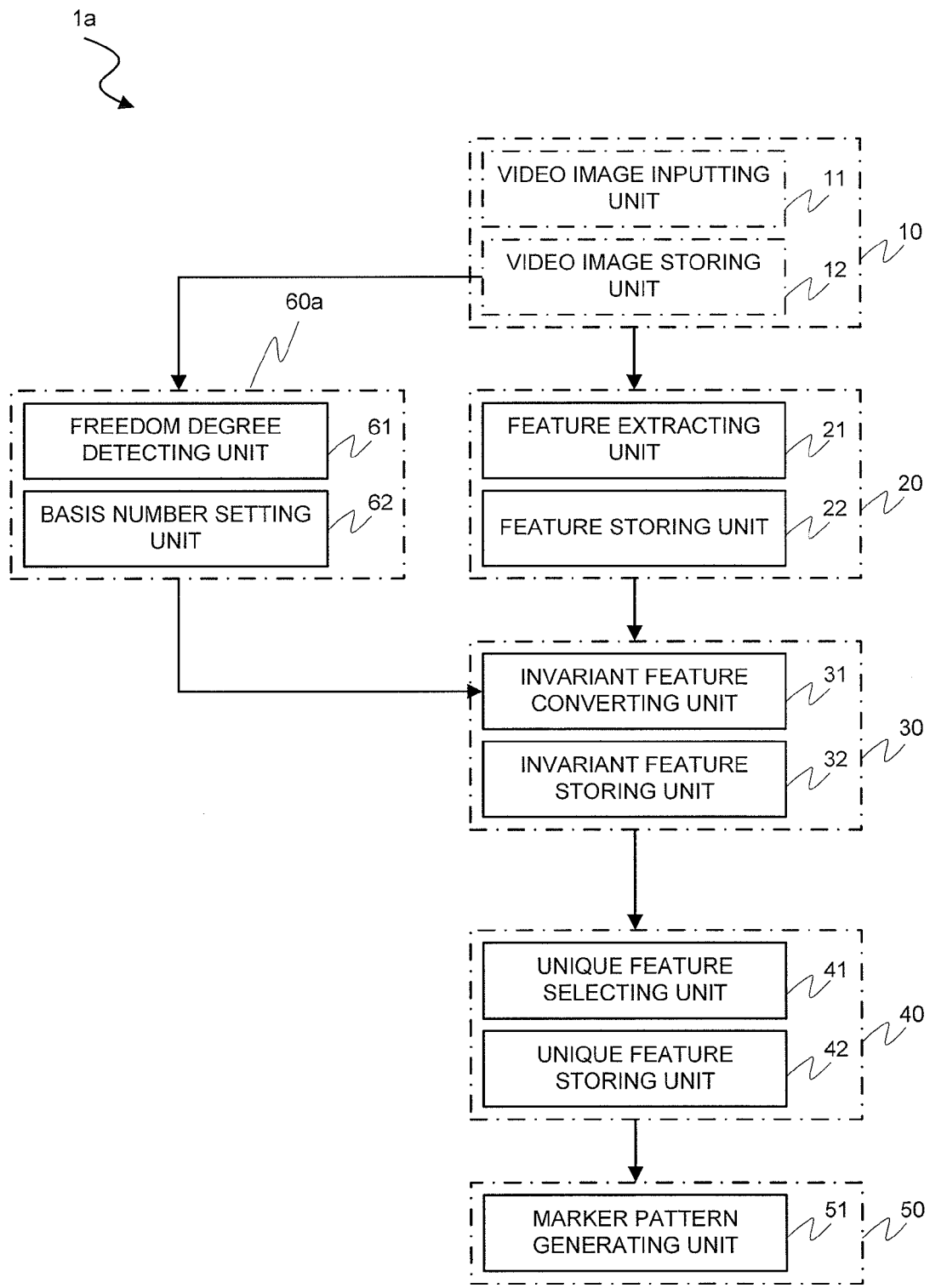
FIG. 2 is a block diagram illustrating a detailed configuration of the marker generation device in the first exemplary embodiment of the present invention.

The video image inputting means 10 includes a video image inputting unit 11 and a video image storing unit 12 as shown in FIG. 2.

The video image inputting unit 11 inputs the background image of a location in which the marker to be generated in this exemplary embodiment is actually used. For example, when a belt-conveyer for transporting the object added with the marker exists, the above background image is equivalent to a video image obtained by imaging the belt-conveyer in the situation of not transporting the above object and its neighbor, or the like.

The above background image could be a moving image (video image), and further, could be plural pieces of the still images taken at a predetermined time interval. In addition, the above background image may include a live video image, a recorded video image, a delivered video image, or the like.

Further, the video image inputting unit 11 may include the imaging device for itself. In this case, the video image inputting unit 11 may incorporate the situation adjacent the location in which the corresponding marker generation device 1a has been mounted as the background image.

In addition, the video image inputting unit 11 may input the background images incorporated by devices other than the corresponding marker generation device 1a via a communication network, a communication cable or the like.

Figure 3:
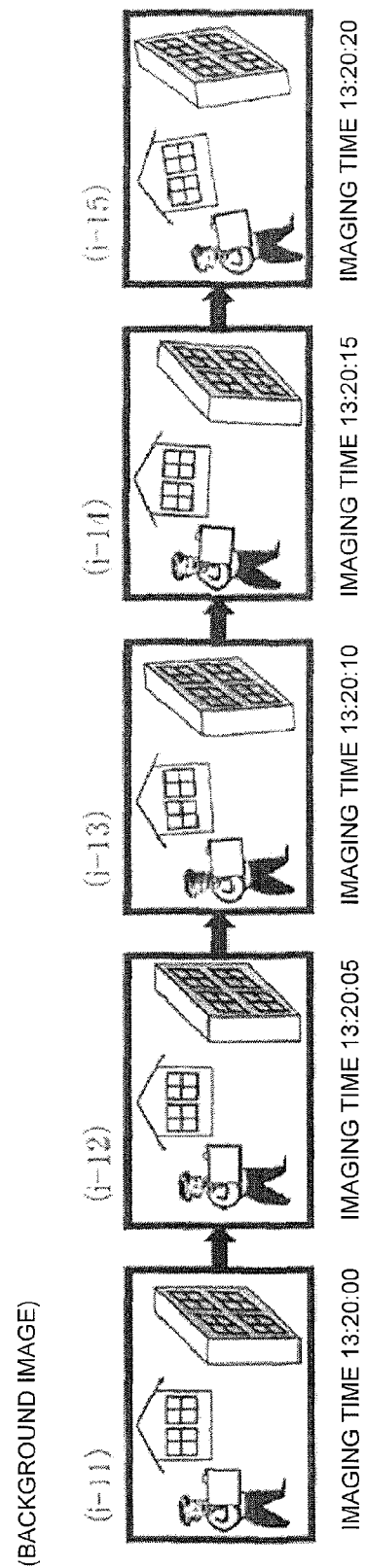
FIG. 3 is a view illustrating the background video image that is comprised of a plurality of frame images.

An example of the background images inputted by this video image input inputting 11 is shown in FIG. 3 (i-11) to (i-15).

The video image storing unit 12 stores the background image as a digitized frame image. The so-called digitized frame image points to each piece of the still images constituting the video images of the background shown in FIG. 3 (i-11) to (i-15).

Further, the video image storing unit 12 stores the number added to each of a plurality of the frame images (for example, serial number). This number uniquely identifies one piece of the frame image. The above number is equivalent to (i-11), (i-12), (i-13), . . . in FIG. 3.

In addition, the video image storing unit 12 may also store information specifying a time when the frame image was taken.

The feature extracting means 20, as shown in FIG. 2, includes a feature extracting unit 21 and a feature storing unit 22.

The feature extracting unit 21 takes out the background images, namely, the frame images from the video image storing unit 12. And, the feature extracting unit 21 extracts the image features containing characteristic patterns within the taken-out frame images.

Figure 4:
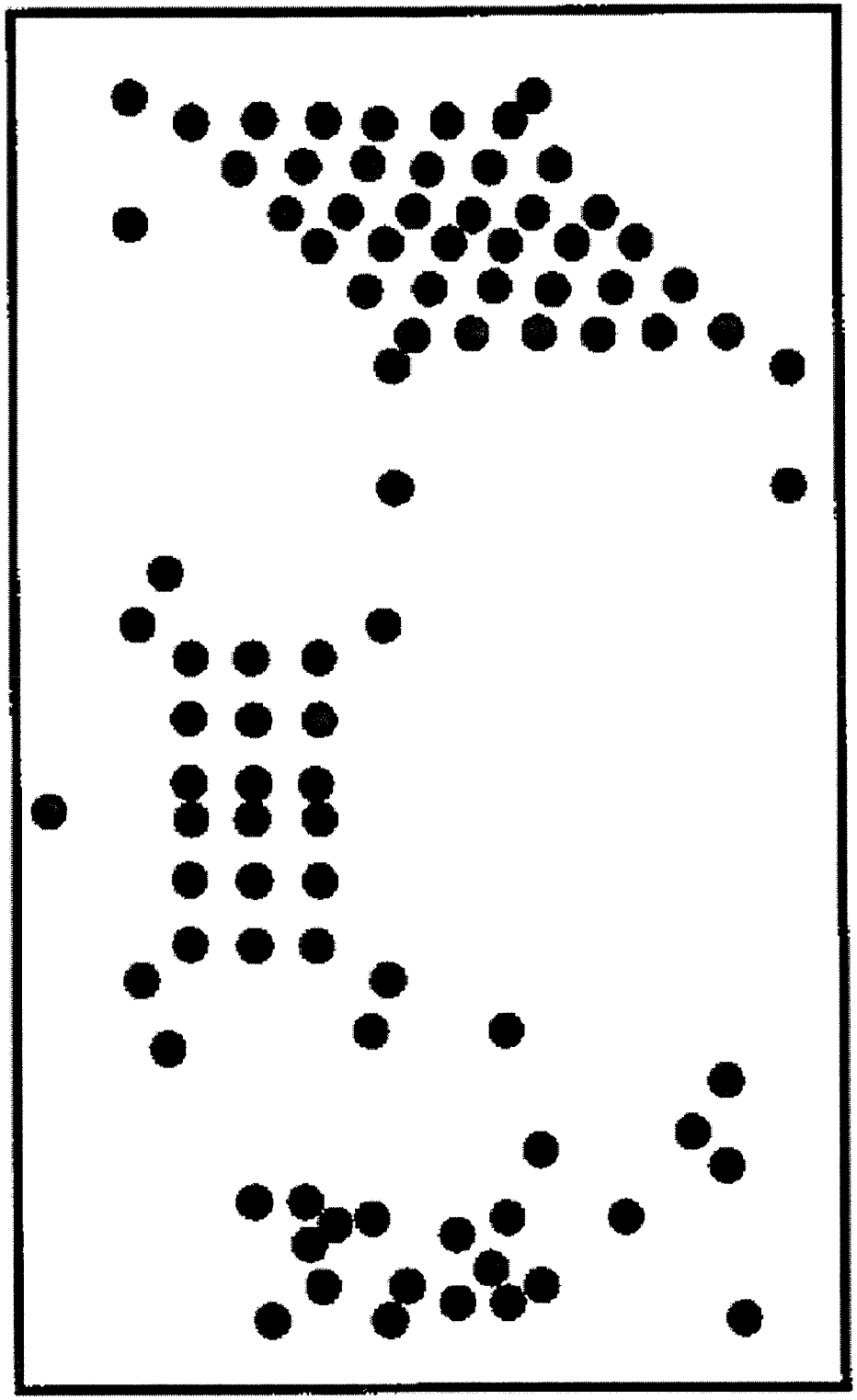
FIG. 4 is a view illustrating a feature space having a plurality of feature points arranged therein.

For the image feature, a graphically distinctive property in the form of numeric values may be used, for example. For example, the method presented in Computer Vision and Pattern Recognition proceeding, IEEE Computer Society Conference, 1998 may be used therefor. This method is capable of extracting vertices of a shape of the object, intersections of linear objects, endpoints, etc. in the image. And, a series of position coordinate information of these points on the image may be defined as graphical features. For example, upon extracting the feature points for the frame image of FIG. 3 (i-11) with this method, the feature points are arranged in plural number as shown in FIG. 4. The feature points may be managed with the coordinates on a one-by-one basis.

Additionally, the space having the feature points arranged therein is called a feature space.

Further, as another method, there exists, for example, the method disclosed by Montanari in "On the option detection of curves in noisy pictures," Communications of ACM, 14, 1971. According to this, entries in an R table in which a distance from a reference point and a relative angle are stored may be used as the features. At this moment, by defining the reference point for all of the feature positions and exhaustively extracting the features, the marker may be made robust against partial loss of the features.

In addition, as another method of extracting the features, for example, there exists the method of using a luminance value or a color difference value of each pixel on the image as the feature.

Figures 5, 6:
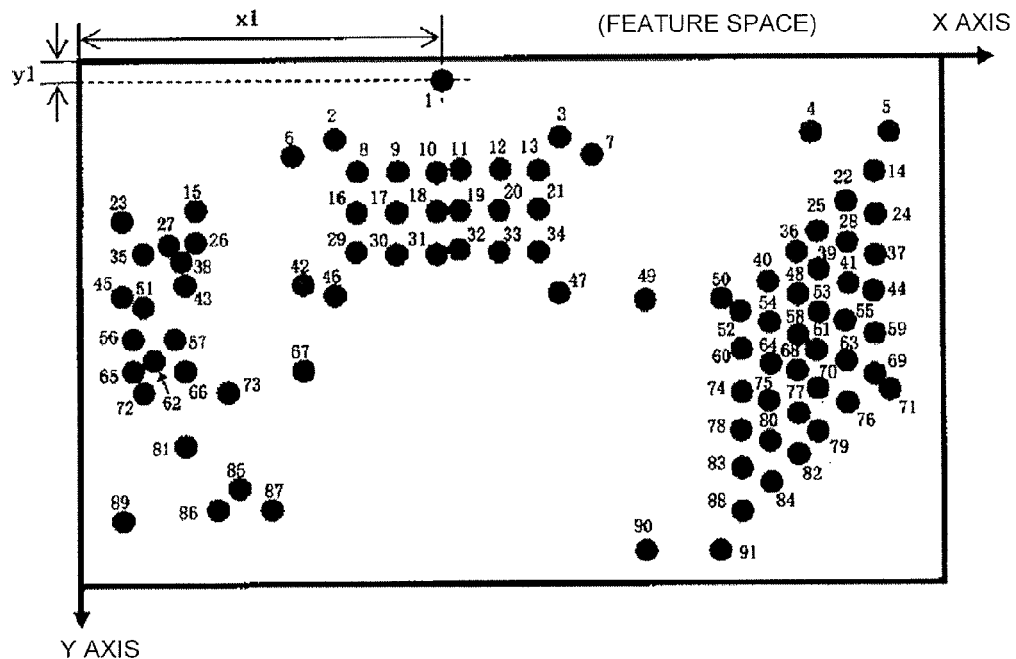
FIG. 5 is a view illustrating a situation in which numbers are added to the feature points arranged in the feature space.
FIG. 6 is a chart illustrating a configuration of a feature point information table.

Next, the feature extracting unit 21 adds the serial number to each of the feature points as shown in FIG. 5. This serial number may be added in the descending order of the feature point, to begin with the highest-ranked feature point, in such a manner of 1, 2, 3, 4, . . . .

Continuously, the feature extracting unit 21 obtains respective coordinates of the feature points. For the coordinates, as shown in FIG. 5, an X axis and a Y axis may be set in the feature space to define a distance from the Y axis and a distance from the X axis as an X coordinate and a Y coordinate, respectively.

And, the feature extracting unit 21 causes the feature storing unit 22 to store the serial numbers and the coordinates of these feature points.

The feature storing unit 22 may store these serial numbers and coordinates, and the like as "a feature point information table" as shown in FIG. 6.

"The feature point information table", as shown in the same figure, may include "the serial number of the frame image" (A), "the serial number of the feature point" (B), "the X coordinate of the feature point" (C), "the Y coordinate of the feature point" (D), and "the information related to the feature point" (E) as an item, respectively.

"The serial number of the frame image" is indicative of the number added to the frame image from which the feature points have been extracted.

"The information related to the feature points" may incorporate, for example, elements (edges, an intersections, etc.) recognized as the features as well as hue, brightness, and chroma of the pixel in which the feature point is positioned, and the like.

The invariant feature converting means 30, as shown in FIG. 2, includes an invariant feature converting unit 31 and an invariant feature storing unit 32.

The invariant feature converting unit 31 takes out the coordinates of the feature points from the feature storing unit 22, and maps the above feature points onto the invariant feature space with a predetermined conversion process.

Specifically, the invariant feature converting unit 31 selects the reference point from among the feature points on the feature space, arranges this reference point so that it comes to the reference coordinate of the invariant feature space, and arranges all of other feature points as well in the invariant feature space with the identical conversion rule. Hereinafter, this reference point is referred to as "a basis".

The number of this basis is decided responding to the kinds of the postural changes of the object in the back ground video image. This number is referred to as "a basis number".

In this exemplary embodiment, the kind of the postural change is called "a freedom degree", and a basis number setting unit 62 to be later described decides the basis number of 1 to 3 responding to this freedom degree.

Further, the invariant feature converting unit 31 is configured to change the method of mapping the feature points onto the invariant feature space responding to the basis number.

Thereupon, the method of mapping the feature points based on the basis will be explained basis number by basis number.

Additionally, it is assumed that the feature points extracted from a certain frame image are arranged in the feature space as shown in FIG. 4, and these feature points are mapped onto the invariant feature space.

(Mapping in the Case in which the Basis Number is One)

When carrying out the mapping based upon the basis of which the basis number is one (1), the invariant feature converting unit 31 decides one feature point as the basis, moves this feature point so that it comes to a location of one reference coordinate on the invariant space, and moves all of other feature points as well to the invariant feature space by an amount of this movement.

Figure 7:
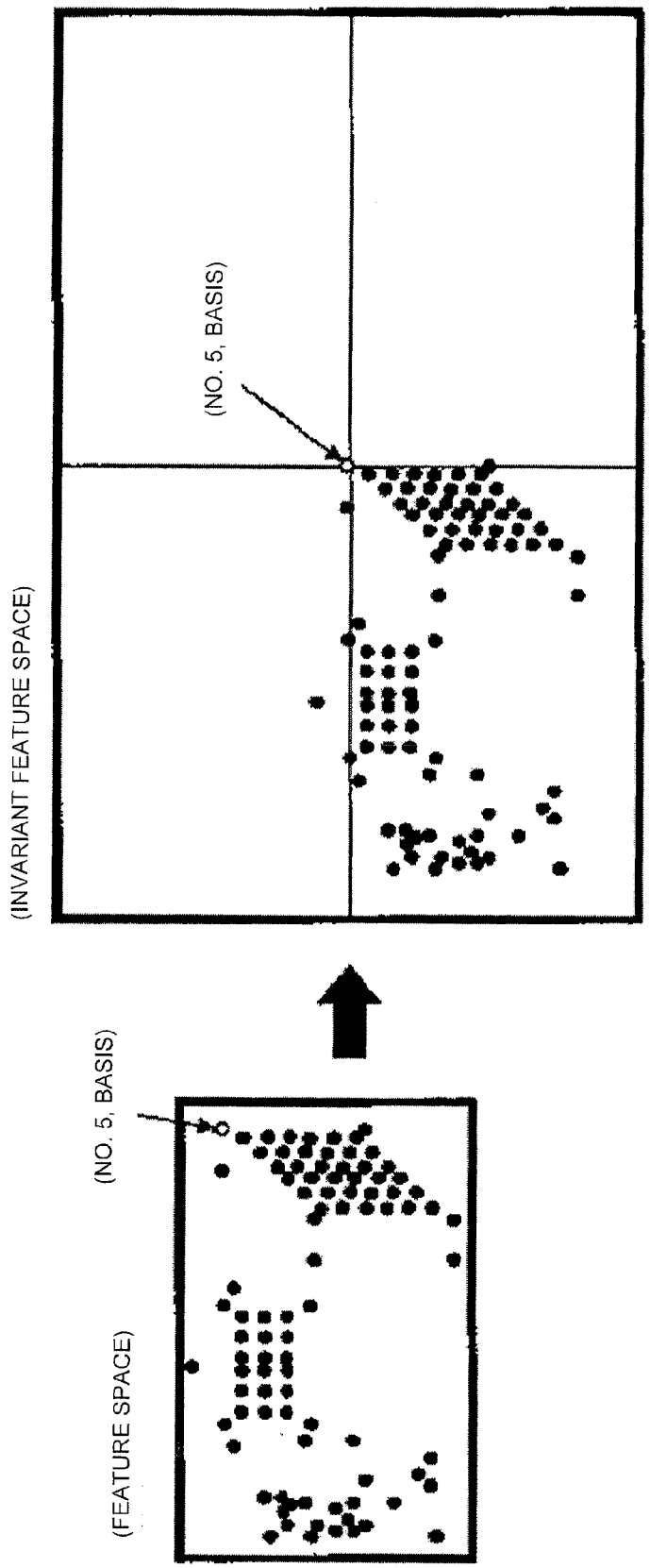
FIG. 7 is a view illustrating a situation in which each feature point is mapped onto the invariant feature space with a feature point no. 5 defined as a basis.

For example, as shown in FIG. 7, the invariant feature converting unit 31 defines the feature point with the serial no. 5 as the basis, and translates all of the feature points so that this feature point with no. 5 comes to a location of coordinate (0, 0) in the invariant feature space. This allows the feature points to be arranged in the invariant feature space as shown in the right of the same figure. The feature point arranged in the invariant feature space is referred to as "an invariant feature".

Figure 8:
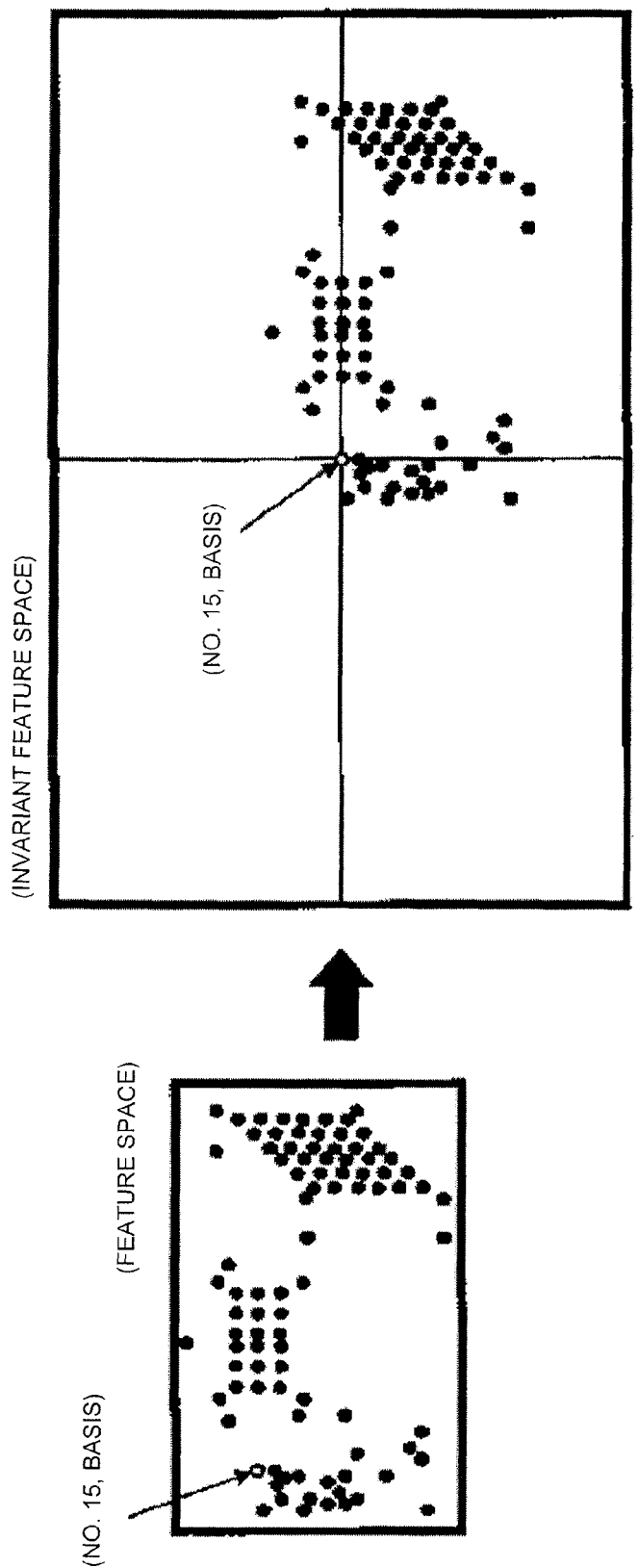
FIG. 8 is a view illustrating a situation in which each feature point is mapped onto the invariant feature space with a feature point no. 15 defined as a basis.

Further, as shown in FIG. 8, when the invariant feature converting unit 31 defines the feature point with serial no. 15 as the basis, and translates all of the feature points so that the feature point with no. 15 comes to a location of coordinate (0, 0) in the invariant feature space, an invariant feature group is arranged as shown in the invariant feature space of the right of the same figure.

In such a manner, the invariant feature converting unit 31 maps the feature points onto the invariant feature space by performing a process of deciding one feature point as the basis, and translating all of the feature points, accompanied with the movement of this basis to an origin of the invariant feature space, whenever sequentially deciding each feature point as the basis, and overlapping these moved feature points.

Figure 9:
FIG. 9 is a view illustrating a situation in which all of the feature points are mapped onto the invariant feature space in the case in which the number of the bases is one.

A result of having mapped the feature points shown in FIG. 4 onto the invariant feature space with the above-mentioned method is one shown in FIG. 9. This is a situation in which the invariant features have been arranged in the invariant feature space when the basis number is one (1).

(Mapping in the Case in which the Basis Number is Two)

When carried out the mapping based upon the basis of which the basis number is two, the invariant feature converting unit 31 decides two feature points as the bases, moves these bases so that the bases comes to locations of two corresponding reference coordinates on the invariant space, respectively, and moves all of other feature points to the invariant feature space, accompanied therewith, while keeping a relative positional relationship. And, the invariant feature converting unit 31 performs this movement for each basis that is comprised of a combination of two points selectable from among all of the feature points.

Figure 10:
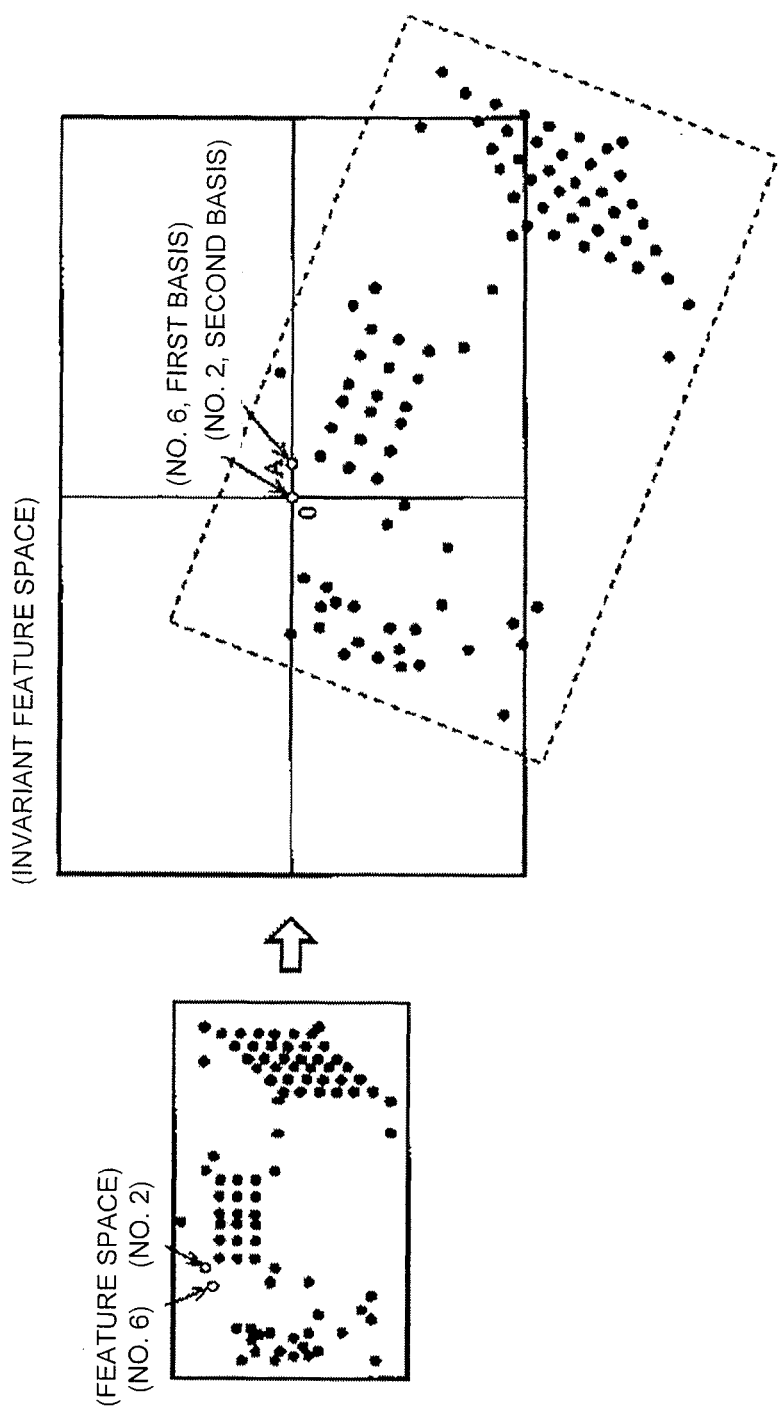
FIG. 10 is a view illustrating a situation in which each feature point is mapped onto the invariant feature space with a feature point no. 6 and a feature point no. 2 defined as a first basis and a second basis, respectively.

For example, as shown in FIG. 10, when the feature point with the serial no. 6 and the feature point with the serial no. 2 are defined as a first basis and a second basis, respectively, the invariant feature converting unit 31 moves the first basis and the second basis to coordinate O (0, 0) and coordinate A (1, 0) of the invariant feature space, respectively, and moves all of the other feature points according to the identical conversion rule, accompanied with this.

As a result, the feature points are arranged in the invariant feature space as shown in the right of the same figure.

Figure 11:
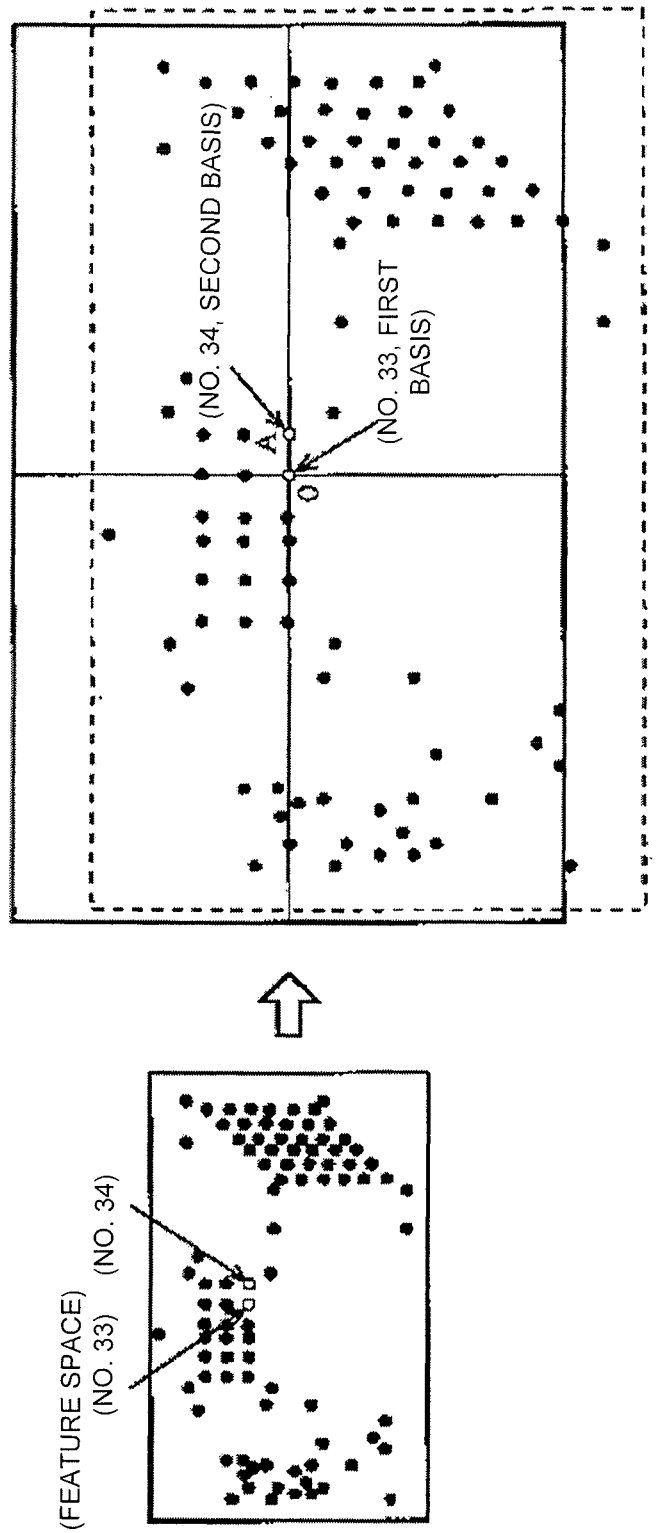
FIG. 11 is a view illustrating a situation in which each feature point is mapped onto the invariant feature space with a feature point no. 33 and a feature point no. 34 defined as a first basis and a second basis, respectively.

Further, as shown in FIG. 11, when the feature point with the serial no. 33 and the feature point with the serial no. 34 are defined as a first basis and a second basis, respectively, the invariant feature converting unit 31 moves the first basis and the second basis to coordinate O (0, 0) and coordinate A (1, 0) of the invariant feature space, respectively, and moves all of the other feature points according to the identical conversion rule, accompanied with this.

As a result, the feature points are arranged in the invariant feature space as shown in the right of the same figure.

In such a manner, the invariant feature converting unit 31 maps the feature points onto the invariant feature space by performing a process of deciding two feature point as the bases, respectively, and translating, rotating, or scaling all of the feature points, accompanied with the movement of these bases to two reference points of the invariant feature space, whenever sequentially deciding a combination of respective feature points as the bases, and overlapping these moved feature points.

(Mapping in the Case in which the Basis Number is Three)

When carrying out the mapping based upon the basis of which the basis number is three, the invariant feature converting unit 31 decides three feature points as the bases, respectively, moves these bases so that the bases comes to locations of three corresponding reference coordinates on the invariant space, respectively, and moves all of other feature points to the invariant feature space, accompanied therewith, while keeping a relative positional relationship. And, the invariant feature converting unit 31 performs this movement for each basis that is comprised of a combination of three points selectable from among all of the feature points.

Figure 12:
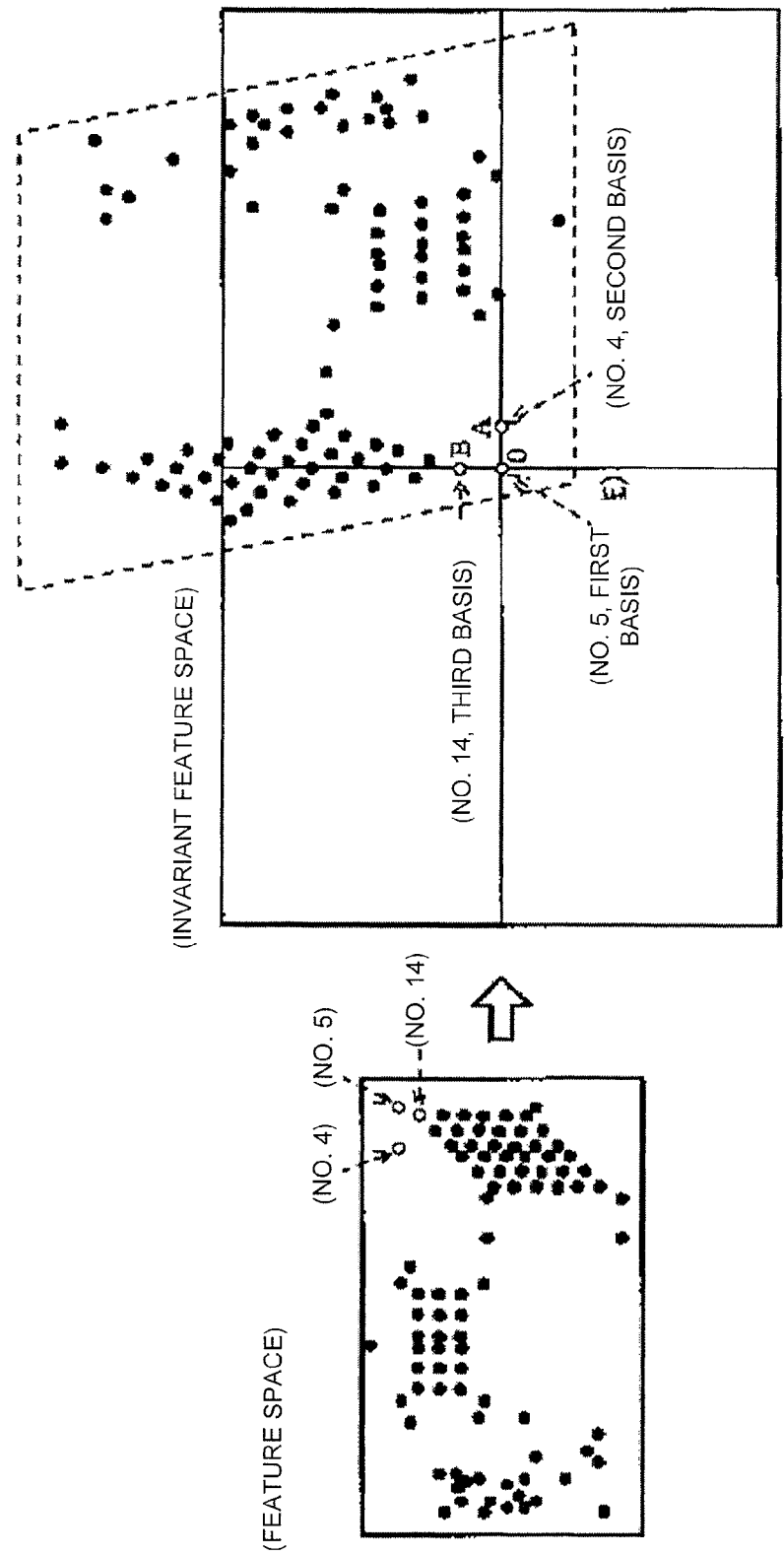
FIG. 12 is a view illustrating a situation in which each feature point is mapped onto the invariant feature space with a feature point no. 5, a feature point no. 4, and a feature point no. 14 defined as a first basis, a second basis, and a third basis, respectively.

For example, as shown in FIG. 12, when the feature point with the serial no. 5, the feature point with the serial no. 4, and the feature point with the serial no. 14 are defines as a first basis, a second basis, and a third basis, respectively, the invariant feature converting unit 31 moves the first basis, the second basis, and the third basis to coordinate O (0, 0), coordinate A (1, 0), and coordinate B (0, 1) of the invariant feature space, respectively, and moves all of the other feature points according to the identical conversion rule, accompanied with this.

As a result, the feature points are arranged in the invariant feature space as shown in the right of the same figure.

Figure 13:
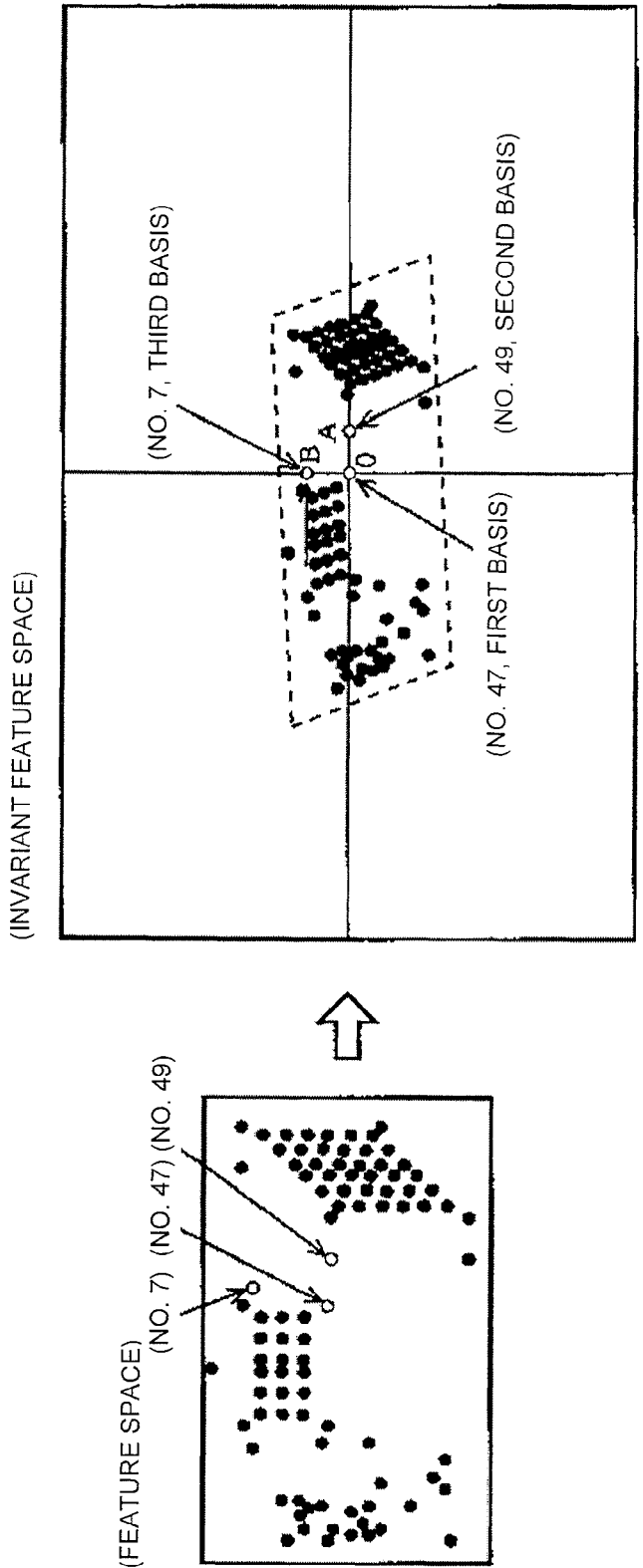
FIG. 13 is a view illustrating a situation in which each feature point is mapped onto the invariant feature space with a feature point no. 47, a feature point no. 49, and a feature point no. 7 defined as a first basis, a second basis, and a third basis, respectively.

Further, as shown in FIG. 13, when the feature point with the Ser. No. 47, the feature point with the Ser. No. 49, and the feature point with the Ser. No. 7 are defined as a first basis, a second basis, and a third basis, respectively, the invariant feature converting unit 31 moves the first basis, the second basis, and third basis to coordinate O (0, 0), coordinate A (1, 0), and coordinate B (0, 1) of the invariant feature space, respectively, and moves all of the other feature points according to the identical conversion rule, accompanied with this.

As a result, the feature points are arranged in the invariant feature space as shown in the right of the same figure.

In such a manner, the invariant feature converting unit 31 maps the feature points onto the invariant feature space by performing a process of deciding three feature point as the bases, respectively, and translating, rotating, scaling, or shear-deforming all of the feature points, accompanied with the movement of these bases to three reference points of the invariant feature space, whenever sequentially deciding a combination of respective feature points as the bases, and overlapping these moved feature points.

Additionally, the so-called shear deformation is a deformation such that orthogonality is not maintained, but parallelism is maintained, and for example, a deformation such that a square is converted into a parallelogram.

Figure 14:
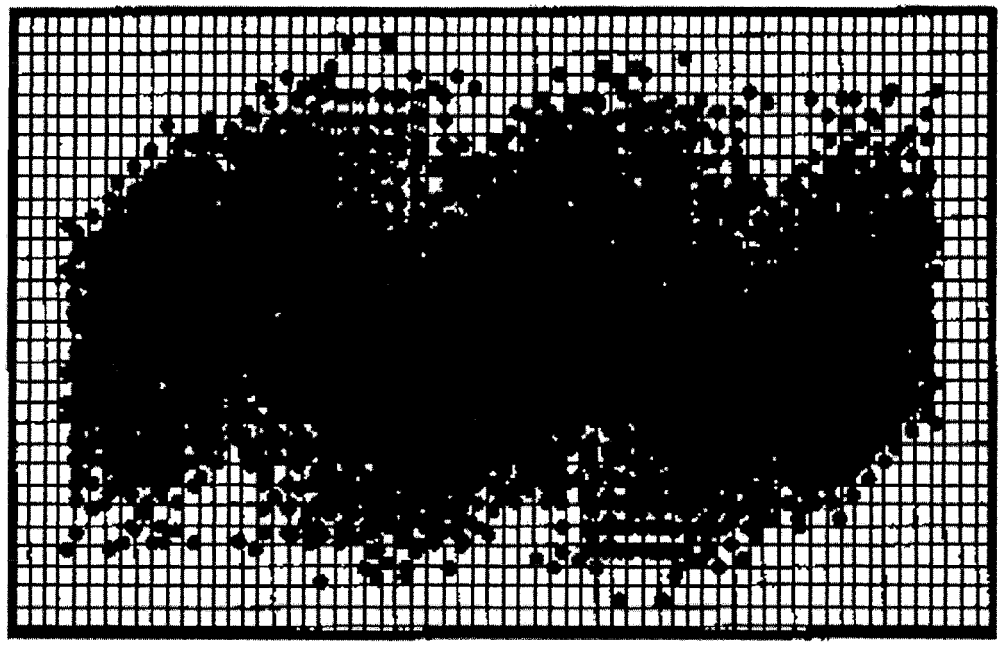
FIG. 14 is a view illustrating a situation in which segment lines are added to the invariant feature space.

Next, the invariant feature converting unit 31 divides the invariant feature space into a plurality of segments by using grid-shape mesh cells as shown in FIG. 14. And, the invariant feature converting unit 31 obtains the number of the invariant features for each segment.

Figure 15:
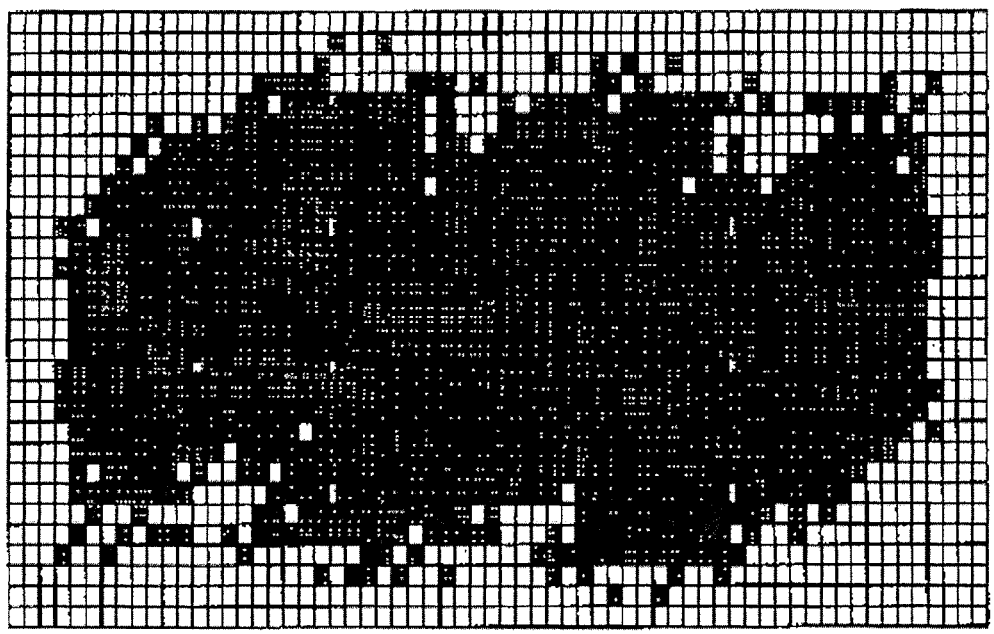

Additionally, so as to make the explanation easily understandable, the invariant feature space in which the segments of which the invariant feature number is one or more are filled-in is shown in FIG. 15.

The invariant feature storing unit 32 holds a predetermined memory region. This invariant feature storing unit 32 stores each kind piece of data obtained by the invariant feature converting unit 31. The kind pieces of data contain, for example, the coordinate of each invariant feature arranged in the invariant feature space, the coordinate (scope) of each segment, and the by-segment invariant feature number, and the like.

The unique feature selecting means 40 includes a unique feature selecting unit 41 and unique feature storing unit 42 as shown in FIG. 2.

Figure 16:
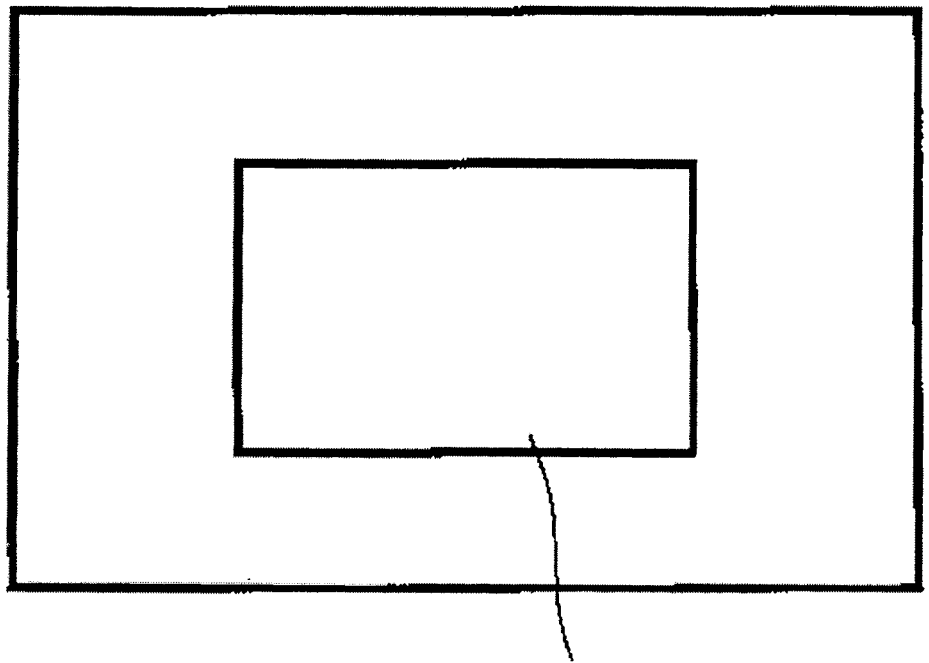
FIG. 16 is a view illustrating a marker pattern generation scope in the mapping onto the invariant feature space.

The unique feature selecting unit 41 decides the scope, in which the marker pattern is generated, within the invariant feature space as a marker pattern generation scope as shown in FIG. 16. Size of this marker pattern generation scope may be made equal to that of the still image frame. Next, the unique feature selecting unit 41 takes out the by-segment invariant feature numbers in the above marker pattern generation scope from the invariant feature storing unit 32.

Continuously, the unique feature selecting unit 41 selects the segments corresponding to zero, or a predetermined value or less, out of the taken-out invariant feature numbers, as the unique features. In this exemplary embodiment, it is assumed that the segments having "0" described therein are selected in the invariant feature number distribution shown in the marker pattern generation scope of FIG. 17. This enables the unique feature selecting unit 41 to select the image features not appearing in the background video images inputted by the video image inputting means 10 as the unique features.

In such a manner, the unique feature selecting unit 41 may select the unique feature as the feature that does not match with any background pattern, namely, may select the unique feature from among the invariant features that are founded upon the segment of the feature space in which none of the feature group extracted from the background video image appears.

This selection of the unique features may be regarded as equivalent to a problem of finding a large blank space from a distribution of the invariant features in the invariant feature space, whereby the algorithm such as, for example, "An Algorithm for Finding Maximal Whitespace Rectangles at Arbitrary Orientations for Document Layout Analysis" presented in Proceedings of the International Conference on Document Analysis and Recognition (2003) may be used to extract a large region, or a center of the obtained rectangular region that contains no invariant feature may be defined as the unique feature.

Another method may involve quantizing the invariant feature space in a mesh cell (segment) having a particular size, generating a one-dimensional or multi-dimensional histogram, and defining the center of the segment of which an occurrence frequency of the invariant feature becomes zero as the unique feature. When the segment of which the frequency becomes zero does not exist, the width of the segment may be reduced to generate a histogram, and when the segment of which the frequency becomes zero appears, the unique feature may be selected from the segments at this time. When no mesh cell of which the frequency becomes zero is found, a threshold process may be applied to the histogram by using a predetermined value to select the unique features from the mesh cells having a value equal to or less than the predetermined value.

Figure 18:
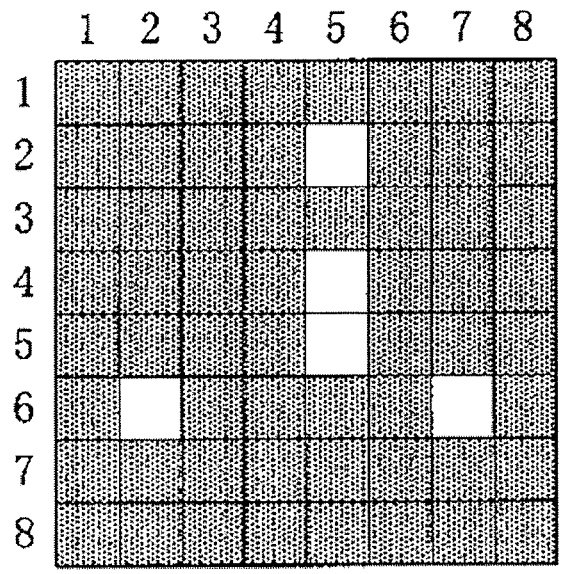
FIG. 18 is a view illustrating a configuration of a unique feature arrangement diagram.
Figure 19:
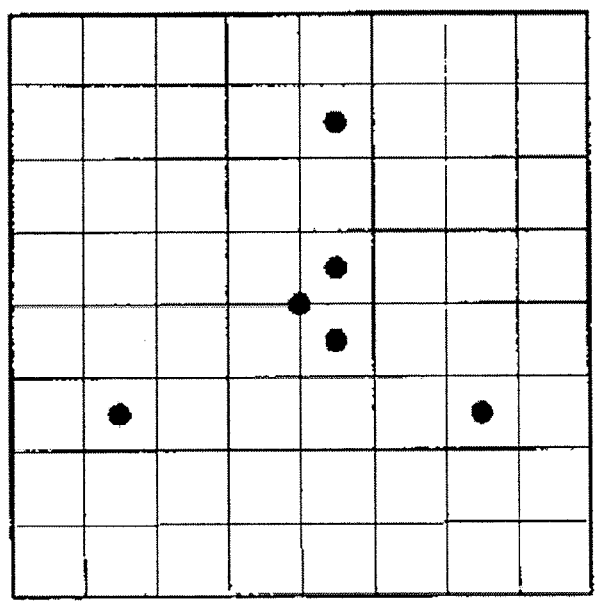
FIG. 19 is a view illustrating another configuration of the unique feature arrangement diagram.

Another example of the unique features selected by the unique feature selecting unit 41 is shown in FIG. 18 and FIG. 19. In a unique feature arrangement diagram shown in FIG. 18, the segment determined to be a segment of the unique feature is displayed in white color, and the segment determined not to be a segment of the unique feature is shaded in a gray color. FIG. 19 is a view in which centers of the unique features and a center point of the unique feature arrangement diagram are displayed with "●" based upon the unique feature arrangement diagram shown in FIG. 18.

Figure 17:
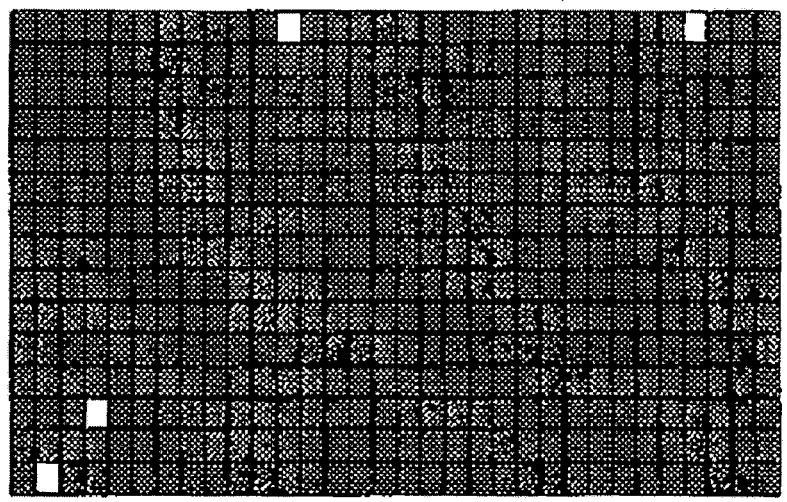
FIG. 17 is a view illustrating the number of the feature points for each segment in the marker pattern generation scope.

Additionally, the four unique features (the segment with the unique feature number of zero) are scatteringly arranged in FIG. 17; however it is assumed that the unique features are selected based upon the arrangements shown in FIG. 18 and FIG. 19 so as to easily explain the process of generating the marker pattern.

The unique feature selecting unit 41 obtains the coordinates of the selected unique features. For example, the unique feature selecting unit 41 defines the coordinates of the unique features as (2,6), (5,2), (5,4), (5,5), and (7,6), respectively, in the unique feature arrangement diagram shown in FIG. 18.

The unique feature storing unit 42 stores the coordinates of the unique features selected by the unique feature selecting unit 41.

The marker generating means 50 includes a marker pattern generating unit 51 as shown in FIG. 2.

The marker pattern generating unit 51 takes out the coordinates of the unique features from the unique feature storing unit 42, and generates the marker pattern based upon these coordinates of the unique features.

There exist various methods as the method of generating the marker pattern.

For example, the case in which vertices, intersections, and endpoints in the image are used as the unique features will be exemplified.

When the aforementioned method disclosed in "On the option detection of curves in noisy pictures", or the like is employed, the detection of the unique feature groups required in generating the marker pattern depends upon the feature point extraction algorithm used by the feature extracting means 20.

For example, the methods of generating the marker pattern are exemplified as described below.

Figures 20, 21:
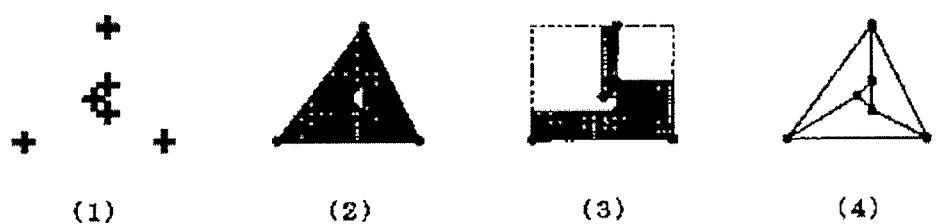
FIG. 20 is a view illustrating an example of the generated markers.
FIG. 21 is a view illustrating a basis number setting table.

(1) The pattern having intersections arranged at the positions of the unique features (FIG. 20 (1));

(2) The pattern generated by repeating a process of finding a convex hull of the unique feature and filling its inside with a specific color, and in addition hereto, finding another convex hull again using the unique feature that is not used in the first convex hull and filling its inside with another color, until all of the unique features are used (FIG. 20 (2));

(3) The pattern formed of an aggregation of filled-in rectangles having the vertices lying at the positions of the unique features and having horizontal and vertical sides (FIG. 20 (3)); and (4) The pattern in which nearest neighbor ones of the unique feature points are connected with line segments (FIG. 20 (4)).

Additionally, when the unique feature converting means 40 extracts the features by using the brightness value or the color difference value, the device for adding the marker to the object may print the marker with paints corresponding to the brightness value and the color difference value that correspond to the unique features.

Further, it is possible to combine the method of utilizing the vertices, the intersections, the endpoints as the figurative feature, and the method of utilizing the brightness value or the color difference value as the feature. In this case, the marker pattern generating unit 51 may generate the markers having the brightness, the color, and the shape corresponding to the selected unique features.

Additionally, as described above, this exemplary embodiment is configured to perform an invariant feature conversion employing the geographical invariants; however, the embodiment employing the other invariants is also possible.

For example, an object-color invariant may be employed.

The color of an object may vary in imaging even the object is same, dependent upon the color of the light source present on the imaging environment. For this, separating and removing an influence of a fluctuation in the light source color from the image makes it possible to obtain the actual object color.

Thus, the actual object color obtained in such a manner may be used as the object-color invariant.

In this case, a portion exhibiting specular reflection is principally affected by the light source color, and the luminance value tends to saturation for the light source color component so that the component may be regarded as the light source color to prevent the color component corresponding to the saturated portion from being selected as the invariant feature.

Besides, the methods of estimating the object color from the image that may be employed include a method by Robby T. Tan and Katsushi Ikeuchi, disclosed in "Separating Reflection Components of Textured Surfaces Using a Single Image" IEEE TRANSACTIONS ON PATTERN ANALYSIS AND MACHINE INTELLIGENCE, VOL. 27, No. 2, FEBRUARY 2005, PP. 178-193, a method by Graham D. Finlayson, Steven D. Hordley, Cheng Lu, and Mark S. Drew disclosed in "On the Removal of Shadows from Images", IEEE TRANSACTIONS ON PATTERN ANALYSIS AND MACHINE INTELLIGENCE, VOL. 28, No. 1, JANUARY 2006, PP. 59-68, and the like.

Further, a texture invariant may be also employed.

A luminance distribution for a partial region in the image is subjected to numerical computation, and the resulting numerical value or vector is defined as a feature quantity. Similarly to the graphical invariant, the texture invariant is susceptible to an influence of the relative positional relationship between the camera and the to-be-imaged target, and thus, the feature quantity insusceptible to this influence is calculated and defined as a texture invariant. For example, the feature quantity invariable against a distance between the camera and the target or a zoom may be implemented by converting a partial image of interest into polar coordinates and taking a power spectrum in the radius direction. In addition, the power spectrum may be taken again with respect to the above-power spectrum in the azimuthal direction to obtain the feature quantity that is invariable against the rotation around an optical axis of the camera. Besides, the method by Chi-Man Pun and Moon-Chuen Lee disclosed in "Log-Polar Wavelet Energy Signatures for Rotation and Scale Invariant Texture Classification" IEEE TRANSACTIONS ON PATTERN ANALYSIS AND MACHINE INTELLIGENCE, VOL. 25, No. 5, May 2003, or the like may be employed.

In addition, with regard to the geometrical invariant, another kind of the geometrical invariant such as that by Richard Hartley and Andrew Zisserman disclosed in "Multiple View Geometry in Computer Vision" may be also employed. When the same scene is observed by a plurality of cameras, the method disclosed in this literature enables information on a distance or a relative positional relationship in the depth direction to be acquired, and in this case, when four points lying in non-identical planes are selected as the bases and the invariant space is assumed to be three-dimensional, a three-dimensional geometric invariant may be created. At this moment, a conversion map is obtained in which one of four bases selected from the feature point groups is caused to correspond to an origin of the invariant space, and the feature points of the other bases are caused to correspond to the position coordinates in the invariant space, and this conversion map is used to map the other features onto the invariant space.

Two or more kinds of the above-described respective invariants containing the geographical invariants relating to this exemplary embodiment may be employed in combination.

A freedom degree measuring means 60a (measuring means) includes a freedom degree detecting unit 61 and a basis number setting unit 62 as shown in FIG. 2.

The freedom degree detecting unit 61 obtains, based upon a background video image, a postural change (freedom degree) in an image environment containing the object (containing the marker) that is reflected onto the above background video image.

Specifically, the freedom degree detecting unit 61 may take out, from the video image storing unit 12 of the video image inputting means 10, two frame images or more each having a different time from among the background video images that are mark-detected to obtain the pattern shape appearing in the above frame images and the postural change of a line.

The basis number setting unit 62 decides the basis number responding to the freedom degree detected by the freedom degree detecting unit 61.

Specifically, the basis number setting unit 62 decides the basis number described below based upon a basis number setting table shown in FIG. 21.

(a) When only the translation is measured→the basis number: 1

(b) When one postural change or more of the expansion, the reduction and the rotation is measured, or a postural change of a combination of its postural change and the translation is measured→the basis number: 2

(c) When the shear deformation is measured, or a postural change of a combination of the shear deformation and one or more of the translation, the expansion, the reduction and the rotation is measured→the basis number: 3

And, the marker generating means 50 generates the marker based upon the basis having the decided basis number via an invariant feature conversion process and a unique feature selection process.

Additionally, as a rule, it becomes possible all the more to cope with the postural changes of the marker as the basis number becomes more numerous; however, a computational load at the moment of generating the marker is augmented.

On the other hand, a computational load necessary for the generating the marker is alleviated all the more as the basis number becomes fewer; however, it becomes difficult to cope with the postural changes of the marker.

Thus, the marker generation device 1a of this exemplary embodiment is configured to measure, from the background image in which the marker is used, a freedom degree thereof beforehand, and generate the marker according to the basis number responding to the above freedom degree, whereby the marker can be detected without complicating the marker beyond a necessity, and yet at a constant certainty.

Figure 22:
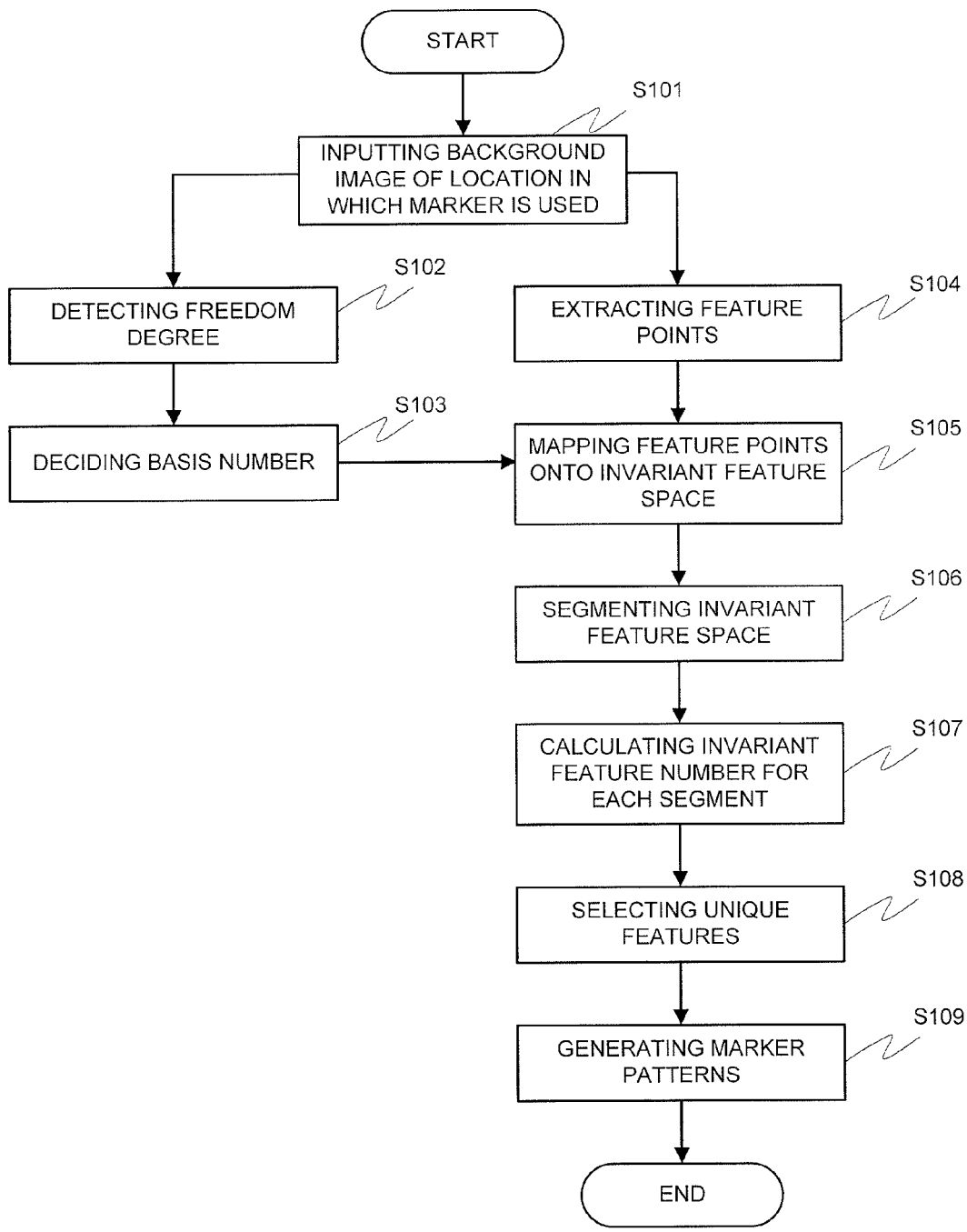
FIG. 22 is a flowchart illustrating an operational procedure of the marker generation device (marker generation method) in the first exemplary embodiment of the present invention.

Next, an operation of the marker generation device of this exemplary embodiment (a method of generating the marker) will be explained by making a reference to FIG. 22.

The same figure is a flowchart illustrating a processing procedure of the marker generation method relating to this exemplary embodiment.

In the marker generation device 1a, the video image inputting unit 11 of the video image inputting means 10 inputs the background image of the location in which the marker is actually used (step 101). For example, when a belt-conveyer for transporting the object added with the marker exists, the video image inputting unit 11 inputs the video images in which the above belt-conveyer and its neighbor are imaged, and the like.

This allows two frame images or more of the still pictures each having a different time to be inputted as shown in FIG. 3. The video image storing unit 12 of the video image inputting means 10 stores the frame images of the video images inputted by the video image inputting unit 11.

The freedom degree detecting unit 61 of the freedom degree measuring means 60a takes out each frame image from the video image storing unit 12, and detects the freedom degree as an index indicative of the kind of the postural change based upon geometrical displacements such as characteristic figures, lines and points to be contained in the frame image (Step 102). For example, the freedom degree detecting unit 61 compares two identical images each of which differs from the other in the time, thereby to detect the postural changes such as the translation, the expansion, the reduction, the rotation, and the shear deformation with regard to the object appearing in its image.

Next, the basis number deciding unit 62 of the freedom degree measuring means 60a decides the basis number responding to the detected freedom degree (Step 103).

On the other hand, the feature extracting unit 21 of the feature extracting means 20 takes out the frame images from the video image storing unit 12, and extracts the feature points from these frame images (Step 104).

Further, the feature extracting unit 21 obtains coordinates of the extracted feature points, and stores the above coordinates in the feature storing unit 22.

Next, the invariant feature converting unit 31 of the invariant feature converting means 30 maps each feature point onto the invariant feature space based upon the basis having the basis number decided by the basis number setting unit 62 (Step 105).

Continuously, the invariant feature converting unit 31 segments the invariant feature space with meshing (Step 106).

Next, the invariant feature converting unit 31 calculates an invariant feature number for each segment (Step 107). The invariant feature storing unit 32 stores the invariant feature numbers calculated for each segment.

Next, the unique feature selecting unit 41 of the unique feature selecting means 40 takes out the by-segment invariant feature numbers from the invariant feature storing unit 32.

Continuously, the unique feature selecting unit 41 selects the segments of which the invariant feature number is zero from among the by-segment invariant feature numbers, and defines the above segments as the unique features (Step 108). The unique feature storing unit 42 stores the coordinates of the segments determined to be the unique features by the unique feature selecting unit 41.

Next, the marker pattern generating unit 51 of the marker generating means 50 takes out the coordinates of the unique features from the unique feature storing unit 42, and generates the marker pattern based upon the above coordinates of the unique features (Step 109).

As explained above, the marker generation device and the marker generation method of this exemplary embodiment allow the pattern not existing in the background image to be generated as the marker.

For this, the pattern existing in the background image is avoided from being erroneously recognized as the marker, and when a predetermined marker appears, the above marker can be detected surely.

Additionally, the method of selecting the unique features from the segments of which the invariant feature number was zero was explained in this exemplary embodiment; however, the selection method is not limited to this method. For example, the unique features may be selected from the segments of which the invariant feature number is equal to or less than a predetermined number.

Further, the marker generation device and the marker generation method of this exemplary embodiment is configured to obtain the postural changes (freedom degree) of the location in which the marker is used and to generate the marker based upon the basis number responding to the above freedom degree.

For this, the marker with a precision suitable for the background image of the location in which the marker is detected, and the kinds of the postural changes of the object appearing in the above background can be generated. That is, it is possible to cope with the postural changes by using the simple marker of which the basis number have been suppressed, dependent upon the kinds of the postural changes, and it is possible to maintain a certain detection precision while suppressing a load that is necessary at the time of generating the marker and at the time of detecting the marker.

Besides, generating the marker having the increased basis number makes it possible to cope with various postural changes as well, and realize the marker detection that is excellent in reliability and stability.

[The Second Exemplary Embodiment of the Marker Generation Device and the Marker Generation Method]

Next, the second exemplary embodiment of the marker generation device and the marker generation method of the present invention will be explained by making a reference to FIG. 23.

Figure 23:
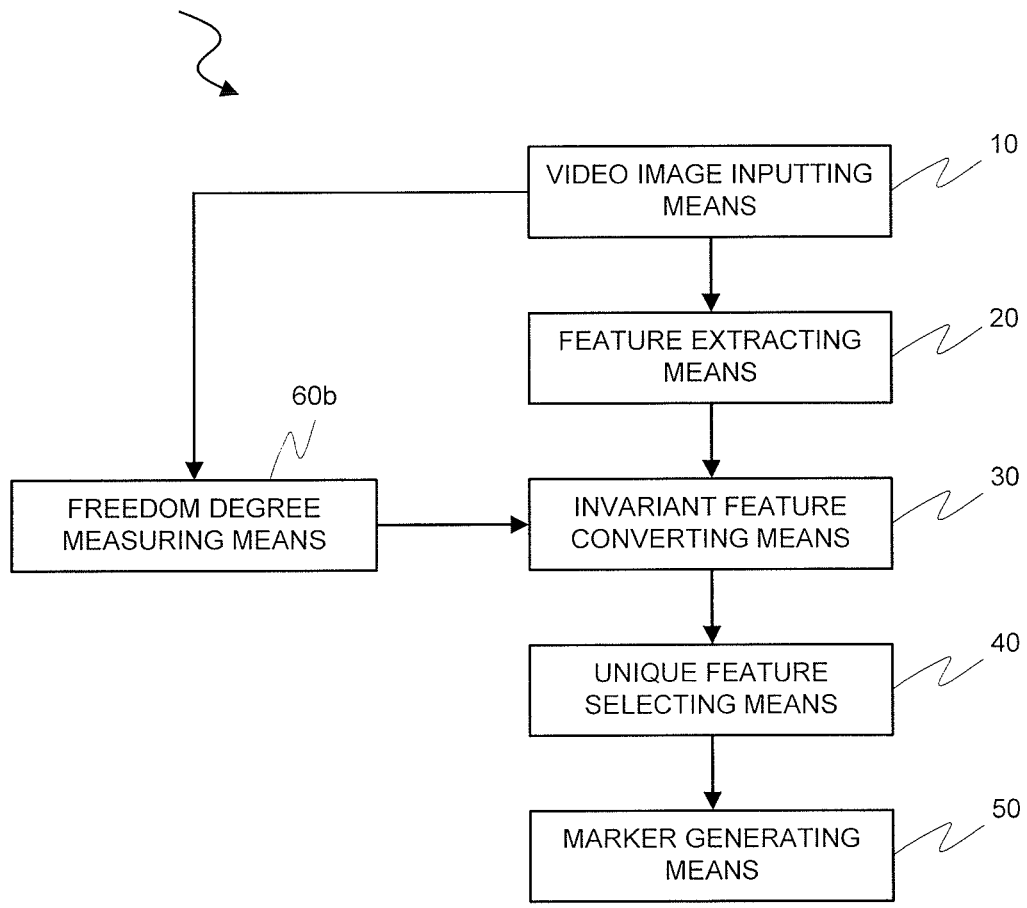
FIG. 23 is a block diagram illustrating a configuration of the marker generation device in a second exemplary embodiment of the present invention.

FIG. 23 is a block diagram illustrating a configuration of the marker generation device of this exemplary embodiment.

Figure 24:
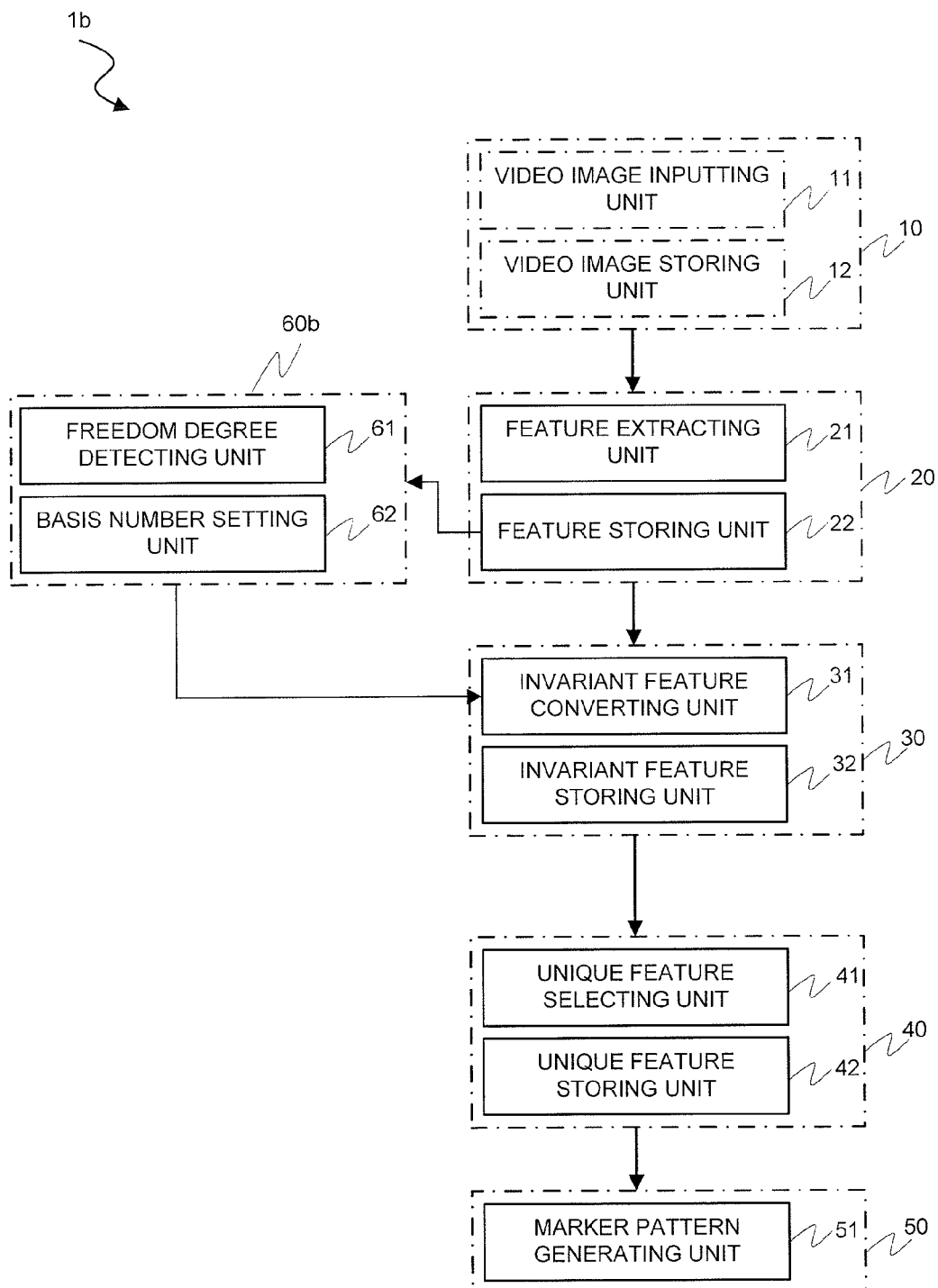
FIG. 24 is a block diagram illustrating a detailed configuration of the marker generation device in the second exemplary embodiment of the present invention.

Further, FIG. 24 is a block diagram illustrating a detailed configuration of the marker generation device of this exemplary embodiment.

This exemplary embodiment is characterized in the method of measuring the freedom degree as compared with the first exemplary embodiment.

Specifically, in a marker generation device 1b of this exemplary embodiment, a freedom degree measuring means (measuring means) 60b is configured to measure the freedom degree based upon positional information of the feature points of the frame image, being the background image. Each of other components is identical to that of the first exemplary embodiment.

Thus, in FIG. 23 and FIG. 24, the identical code is added to a constituent portion similar to that of FIG. 1 and FIG. 2, and the detailed explanation thereof is omitted.

A freedom degree detecting unit 61 of the freedom degree measuring means 60b shown in FIG. 24 analyzes, based upon the background video image, replacements of the coordinates of the feature points of the object (containing the marker) that are reflected onto the above background image, thereby to obtain the postural changes of the above object and the neighbor.

Herein, one example of the method of calculating the freedom degree based upon the feature points will be explained below.

Figure 25:
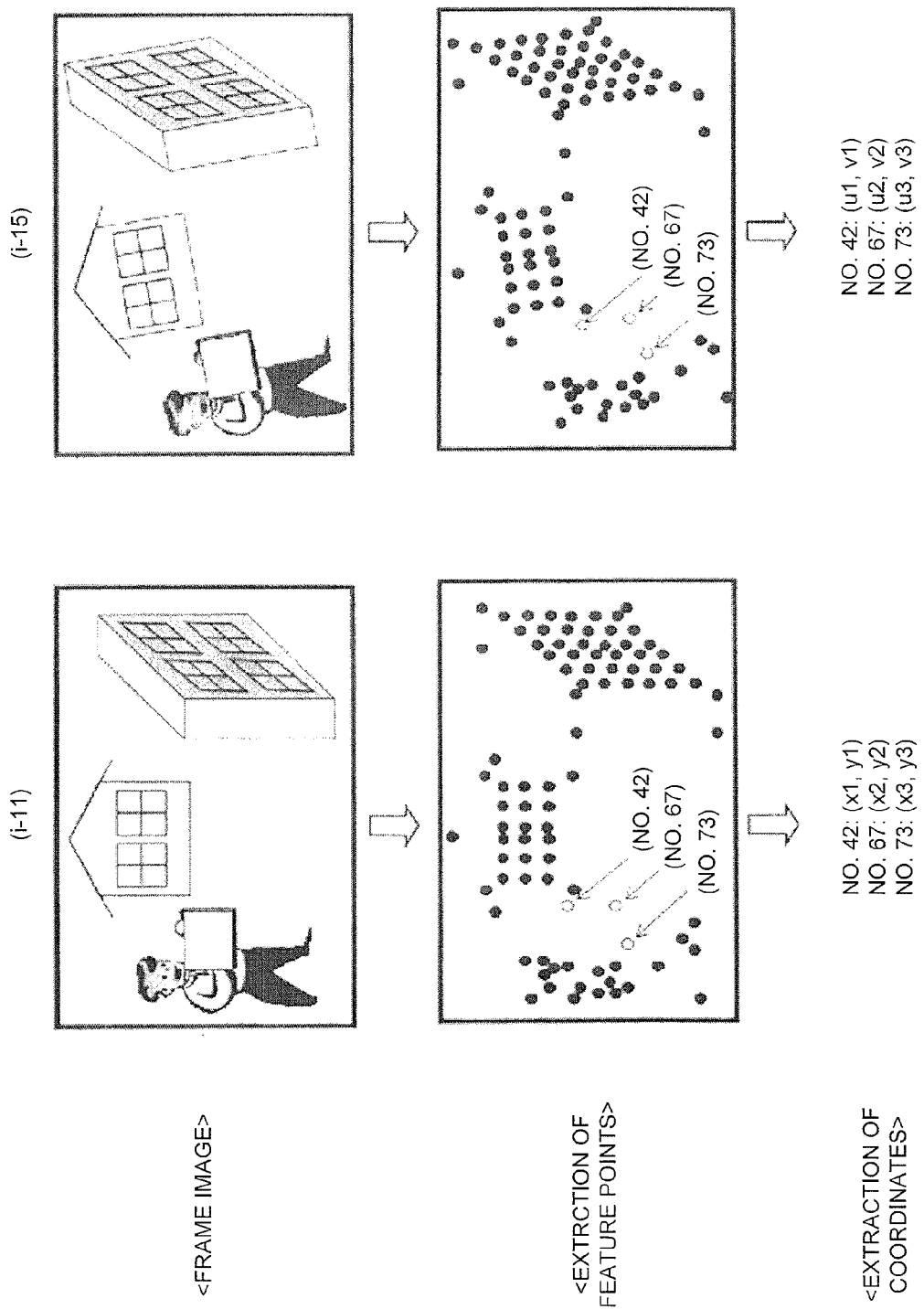
FIG. 25 is an explanatory view for explaining a method of detecting a freedom degree based upon the feature points to be contained in the frame images.

FIG. 25 is an explanatory view for explaining the method of extracting (i-11) and (i-15) from among the frame images shown in FIG. 3, and calculating the freedom based upon the feature points to be contained in these images.

As shown in the same figure, the freedom degree detecting unit 61 takes out the feature points of the frame image of (i-11) and the feature points of the frame image of (i-15) from the feature storing unit 22.

Specifically, the freedom degree detecting unit 61 takes out the coordinates (x1,y1), (x2,y2), and (x3,y3) of the serial no. 42, serial no. 67, and the serial no. 73 of (i-11), and the corresponding coordinates (u1,v1), (u2,v2), and (u3,v3) of (i-15) from "the feature point information table" stored in the feature storing unit 22. Additionally, it is assumed that the correspondence of each feature point is performed with the known methods such as a correlation method and a residual sequential detection method, so a detailed explanation thereof is omitted.

Next, each taken-out coordinate is substituted in an affine transformation matrix shown in FIG. 26(a).

This allows the following numerical equations to be acquired.

$$u1 = a(x1) + b(y1) + c \quad (A)$$

$$u2 = a(x2) + b(y2) + c \quad (B)$$

$$u3 = a(x3) + b(y3) + c \quad (C)$$

$$v1 = d(x1) + e(y1) + f \quad (D)$$

$$v2 = d(x2) + e(y2) + f \quad (E)$$

$$v3 = d(x3) + e(y3) + f \quad (F)$$

Herein, solving ternary simultaneous equations based upon the numerical equations of (A) to (C) makes it possible to calculate affine transformation coefficients of a to c. Likewise, solving ternary simultaneous equations based upon the numerical equations of (D) to (F) makes it possible to calculate affine transformation coefficients of d to f.

And, collating each of the calculated affine transformation coefficients with each parameter of an affine transformation coefficient table shown in FIG. 26(b) makes it possible to detect any of the translation, the rotational movement, the scaling and the shear deformation, or a combination thereof as the freedom degree.

Additionally, an example of detecting the freedom degree based upon three feature points and obtaining the basis number was explained in the above-described example; however, the more the number of the feature points, the higher the detection precision of the freedom degree, and hence, it is possible to determine and set the appropriate basis number.

Further, in this exemplary embodiment, the method of detecting the freedom degree utilizing the affine transformation was explained; however, the detection method is not limited to this method. For example, the method unitizing the other geographical transformation techniques such as a similarity transformation and a projective transformation may be employed.

Figure 27:
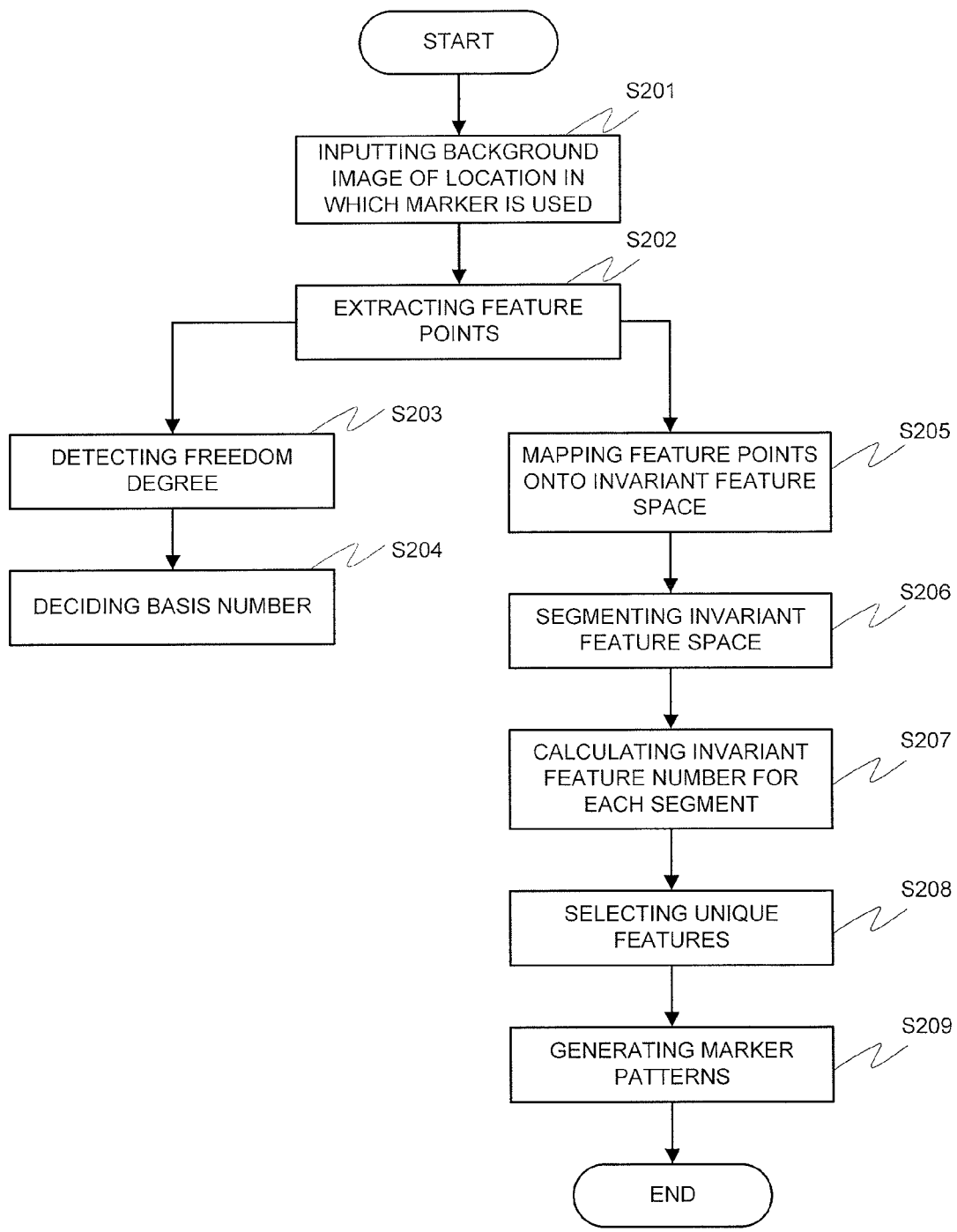
FIG. 27 is a flowchart illustrating an operational procedure of the marker generation device (marker generation method) in the second exemplary embodiment of the present invention.

Next, an operation of the marker generation device of this exemplary embodiment (method of generating the marker) will be explained by making a reference to FIG. 27. The same figure is a flowchart illustrating a processing procedure of the marker generation method relating to this exemplary embodiment.

In the marker generation device 1b, the video image inputting unit 11 of the video image inputting means 10 inputs the background image of the location in which the marker is actually used (step 201). The video image storing unit 12 of the video image inputting means 10 stores the background images (frame images) inputted by the video image inputting unit 11.

The feature extracting unit 21 of the feature extracting means 20 takes out each frame image from the video image storing unit 12, and extracts the feature points thereof (step 202). And, the feature extracting unit 21 stores the coordinate of each of the extracted feature points in the feature storing unit 22.

Next, the freedom degree detecting unit 61 of the freedom degree measuring means 60b takes out the coordinates of the feature points of each frame image from the feature storing unit 22. And, the freedom degree detecting unit 61 detects the freedom degree based upon the displacements of the coordinates of the mutually corresponding feature points (Step 203).

Next, the basis number setting unit 62 of the freedom degree measuring means 60b decides the basis number responding to the detected freedom degree (Step 204).

Next, the invariant feature converting unit 31 of the invariant feature converting means 30 takes out the coordinates of the feature points of the frame images from the feature storing unit 22, and maps each feature point onto the invariant feature space based upon the basis having the basis number decided by the basis number setting unit 62 (Step 205).

Continuously, the invariant feature converting unit 31 segments the invariant space with meshing (Step 206).

Next, the invariant feature converting unit 31 calculates the invariant feature numbers for each segment (Step 207). The invariant feature storing unit 32 stores the calculated by-segment invariant feature numbers.

Next, the unique feature selecting unit 41 of the unique feature selecting means 40 takes out the by-segment invariant feature numbers from the invariant feature storing unit 32.

Continuously, the unique feature selecting unit 41 selects the segments of which the invariant feature number is zero, or is equal to or less than a predetermined number from the by-segment invariant feature numbers, and defines these segments as the unique features (step 208). The unique feature storing unit 42 stores the coordinates of the segments determined to be the unique features by the unique feature selecting unit 41.

Next, a marker pattern generating unit 51 of the marker generating means 50 takes out the coordinates of the unique features from the unique feature storing unit 42, and generates the marker pattern based upon the above coordinate of the unique features (Step 209).

As explained above, the marker generation device and the marker generation method of this exemplary embodiment are capable of extracting the feature points from the background video images in the marker detection environment, utilizing them for forming the marker pattern, and detecting the freedom degree of the marker detection environment by utilizing the above feature points.

This makes it possible not only to exhibit an operation/effect similar to that of the first exemplary embodiment, but also to realize an improvement of an efficiency of the work and a cost reduction owing to sharing the resources.

[The Third Exemplary Embodiment of the Marker Generation Device and the Marker Generation Method]

Figure 28:
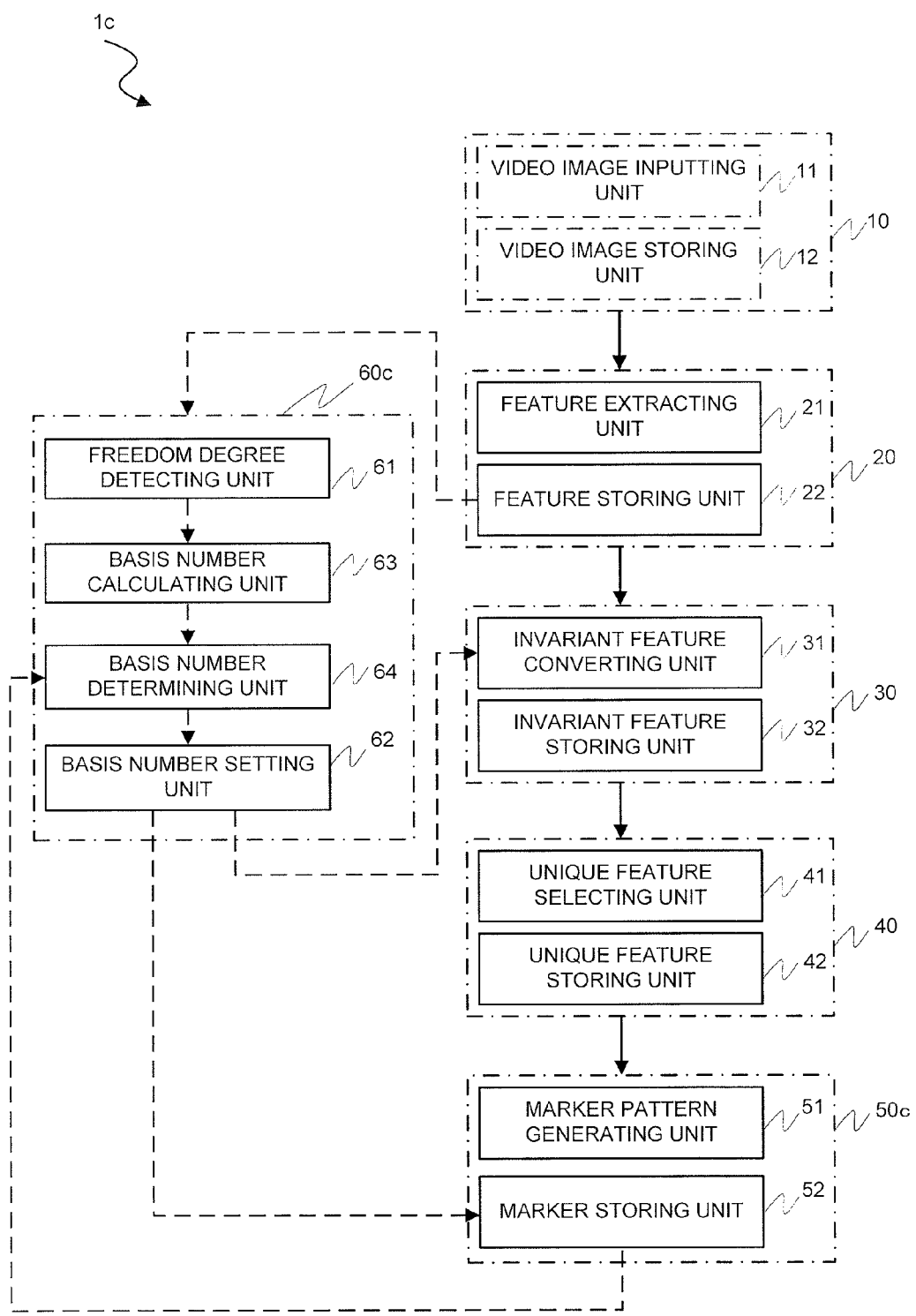
FIG. 28 is a block diagram illustrating a detailed configuration of the marker generation device in a third exemplary embodiment of the present invention.

Next, the third exemplary embodiment of the marker generation device and the marker generation method of the present invention will be explained by making a reference to FIG. 28. FIG. 28 is a block diagram illustrating a detailed configuration of a marker generation device 1c of this exemplary embodiment.

This exemplary embodiment is characterized in determining whether or not to update the marker responding to a situation in which the marker is actually used, and updating the marker when it is required.

Specifically, the marker generation device 1c of this exemplary embodiment obtains the freedom degree in the location in which the marker is actually used, and calculates the appropriate basis number responding to the above freedom degree.

And, the marker generation device 1c is configured to determines whether or not the above calculated basis number matches with the basis number of the marker that was generated just before, and currently is being used, to generate a new marker based upon the above calculated basis number when they do not match with each other, and to perform an operation of not newly generating the marker when they match with each other.

For this, in accordance with this exemplary embodiment, it becomes possible to generate the appropriate marker responding to the environment in which the marker is used on a real-time basis, and further, to maintain it. Further, other components are similar to those of the first exemplary embodiment.

Thus, in FIG. 28, the identical code is added to the constituent portion similar to that of FIG. 2, and the detailed explanation thereof is omitted.

As shown in FIG. 28, a marker generating means 50c of the marker generation device 1c includes a marker storing unit 52.

The marker storing unit 52 stores data related to the markers generated in the marker pattern generating unit 51. In this exemplary embodiment, the marker storing unit 52 stores the basis number related to the marker generated just before in closer cooperation with the basis number setting unit 62. That is, the marker storing unit 52 stores the basis numbers employed for the invariant feature conversion process at the time of generating the marker that is currently being used.

A freedom degree measuring means 60c (measuring means), as shown in FIG. 28, includes a freedom degree detecting unit 61, a basis number setting init 62, and a basis number calculating unit 63, and a basis number determining unit 64.

The freedom degree detecting unit 61 takes out the feature points of an arbitrary frame image from the feature storing init 22 of the feature extracting means 20, and detects the freedom degree.

The basis number calculating unit 63 calculates the basis number responding to the above detected freedom degree.

For calculating the basis number, the predetermined basis number setting table is employed as explained in the first exemplary embodiment described before (see FIG. 21).

The basis number determining unit 64 determines whether or not the basis number calculated based upon the freedom degree matches with the basis number employed at the time of generating the previous marker, and decides the basis number responding to its determination result.

Specifically, the basis number determining unit 64 compares the basis number (the first reference point number) calculated by the basis number calculating unit 63 with the basis number (the second reference point number) stored in the marker storing unit 52, and determines whether or not they match with each other.

When it is determined that the first reference point number and the second reference point number do not match with each other as a result of this determination, the basis number setting unit 62 decides the first reference point number to be the basis number that is employed at the moment of generating the marker.

And, the invariant feature converting means 30 maps the feature points onto the invariant feature space by employing the decided basis number, the unique feature selecting means 40 selects the unique features from the invariant features subjected to the mapping, and the marker generating means 50 generates a new marker based upon the unique features.

That is, in this case, the invariant feature converting means 30 is configured to judge that the environment in which the marker is used has been changed, and to generate a new marker responding to the above environment.

Additionally, the basis number decided herein is stored in the marker storing unit 52. Overwriting and storing the basis number enables the basis number related to the marker generated just before to be employed for the above-mentioned determination at any time.

On the other hand, when the first reference point number and the second reference point number match with each other, the invariant feature converting means 30 is configured to stop the execution until a mismatch of these reference point numbers is determined, and not to generate the marker until then.

That is, in this case, the invariant feature converting means 30 judges that the environment in which the marker is used has not been changed, and does not perform a process of generating a new marker for updating the marker.

Figure 29:
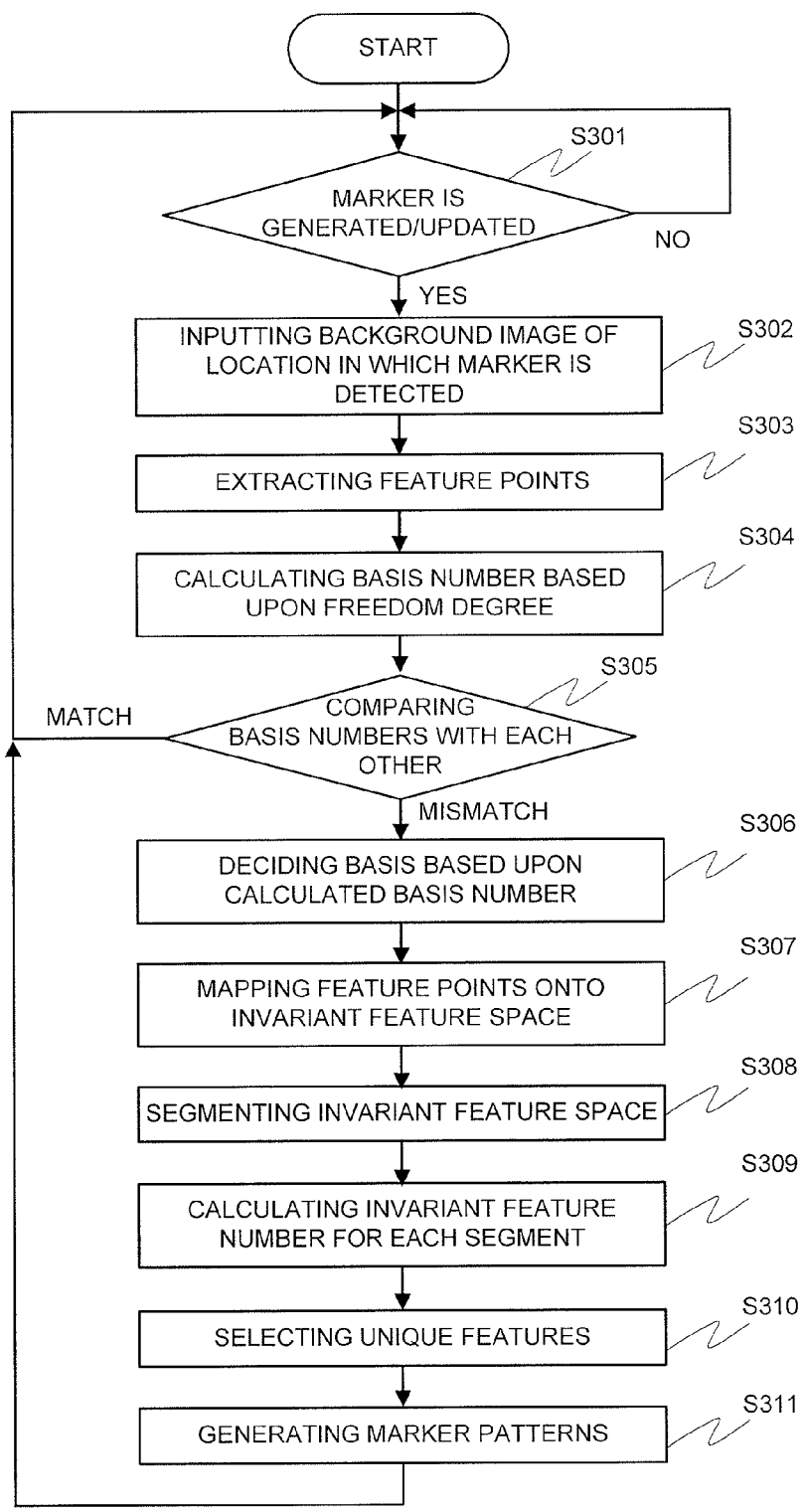
FIG. 29 is s a flowchart illustrating an operational procedure of the marker generation device (marker generation method) in the third exemplary embodiment of the present invention.

Next, an operation of the marker generation device of this exemplary embodiment (method of generating the marker) will be explained by making a reference to FIG. 29.

The same figure is a flowchart illustrating a processing procedure of the marker generation method relating to this exemplary embodiment.

At first, a determination as to whether or not to generate or update the marker is made (step 301). As a matter of fact, a process of generating the marker or updating the marker is initiated at a time or an interval set by a timer not shown in the figure, or responding to a timing that corresponds to a predetermined maneuver.

In the case of carrying out the marker generation (S301: YES), the video image inputting unit 11 of the video image inputting means 10 inputs the background image of the location in which the marker is actually used (step 302). The video image storing unit 12 of the video image inputting means 10 stores the background images inputted by the video image inputting unit 11 as the frame images.

The feature extracting unit 21 of the feature extracting means 20 takes out each frame image from the video image storing unit 12, and extracts the feature points thereof (step 303). The feature extracting unit 21 stores the coordinate of each extracted feature point in the feature storing unit 22.

In the freedom degree detecting means 60c, the freedom degree detecting unit 61 detects the freedom degree, and the basis number calculating unit 63 calculates the basis number responding to the above freedom degree (step 304).

Herein, the basis number determining unit 64 compares the calculated basis number (the first reference point number) with the basis number (the second reference point number) stored in the marker storing unit 52 (Step 305).

When the first reference point number and the second reference point number match with each other as a result of the comparison (S305: match), the operation returns to the step 301. That is, the processes of S301 to S305 are repeated until a mismatch of these basis numbers is confirmed.

On the other hand, when the first reference point number and the second reference point number do not match with each other (S305: mismatch), the basis number setting unit 62 decides the first reference point number to be the basis number of the basis that is employed for generating the marker (S306). The decided basis numbers are stored in the marker storing unit 52.

The invariant feature converting unit 31 of the invariant feature converting means 30 maps each feature point onto the invariant feature space based upon the decided basis number of the basis (Step 307).

Next, the invariant feature converting unit 31 segments the invariant feature space with meshing (Step 308).

Continuously, the invariant feature converting unit 31 obtains the invariant feature number for each segment, and calculates the by-segment invariant feature numbers (Step 309). The invariant feature storing unit 32 stores the calculated by-segment invariant feature numbers.

The unique feature selecting unit 41 of the unique feature selecting means 40 takes out the by-segment invariant feature numbers from the invariant feature storing unit 32.

And, the unique feature selecting unit 41 selects the segments of which the invariant feature number is zero, or is equivalent to or less than a predetermined number from the by-segment invariant feature numbers, and defines these segments as the unique features (Step 310). The unique feature storing unit 42 stores the coordinates of the segments determined to be the unique features by the unique feature selecting unit 41.

The marker pattern generating unit 51 of the marker generating means 50c takes out the coordinates of the unique features from the unique feature storing unit 42, and generates the marker pattern based upon the above coordinates of the unique features (Step 311).

Additionally, the operation returns to the Step 301 after generating the marker, and the marker pattern generating unit 51 remains in waiting for an opportunity of generating the marker.

As explained above, in accordance with the marker generation device and the marker generation method of this exemplary embodiment, the basis number employed for generating the marker that was already generated by the marker generating means 50c and is actually being used is stored beforehand in the marker storing unit 52.

Besides it, the freedom degree measuring means 60c is configured to measure the freedom degrees of the marker and the neighbor of the marker from the background images containing the above marker.

Further, the freedom degree measuring means 60c is configured to determine whether or not the basis number (first reference point number) calculated responding to the freedom degree matches with the basis number (second reference point number) employed for generating the marker just before.

And, the marker pattern generating unit 51 is configured to generate a new marker via the conversion process based upon the basis having the calculated basis number only when these basis numbers do not match with each other.

For this, this exemplary embodiment allows, needless to say, an operation/configuration similar to that of the exemplary embodiments described before to be exhibited, and in addition hereto, a waste of the marker generation to be omitted. That is, this exemplary embodiment makes it possible to make a configuration so that a new marker is generated only when a fluctuation in the postural change exists, and on the other hand, a process of generating the marker is not performed when a fluctuation in the postural change does not exist, in the environment in which the marker is used.

Thus, in the mode in which the generation of the marker and the detection of the marker are unified and used, it becomes possible to realize simplification of the respective processes.

[The Marker Detection Device and the Marker Detection Method]

(The Marker Detection Device)

Next, the marker detection device will be explained by making a reference to FIG. 30 and FIG. 31.

Figure 30:
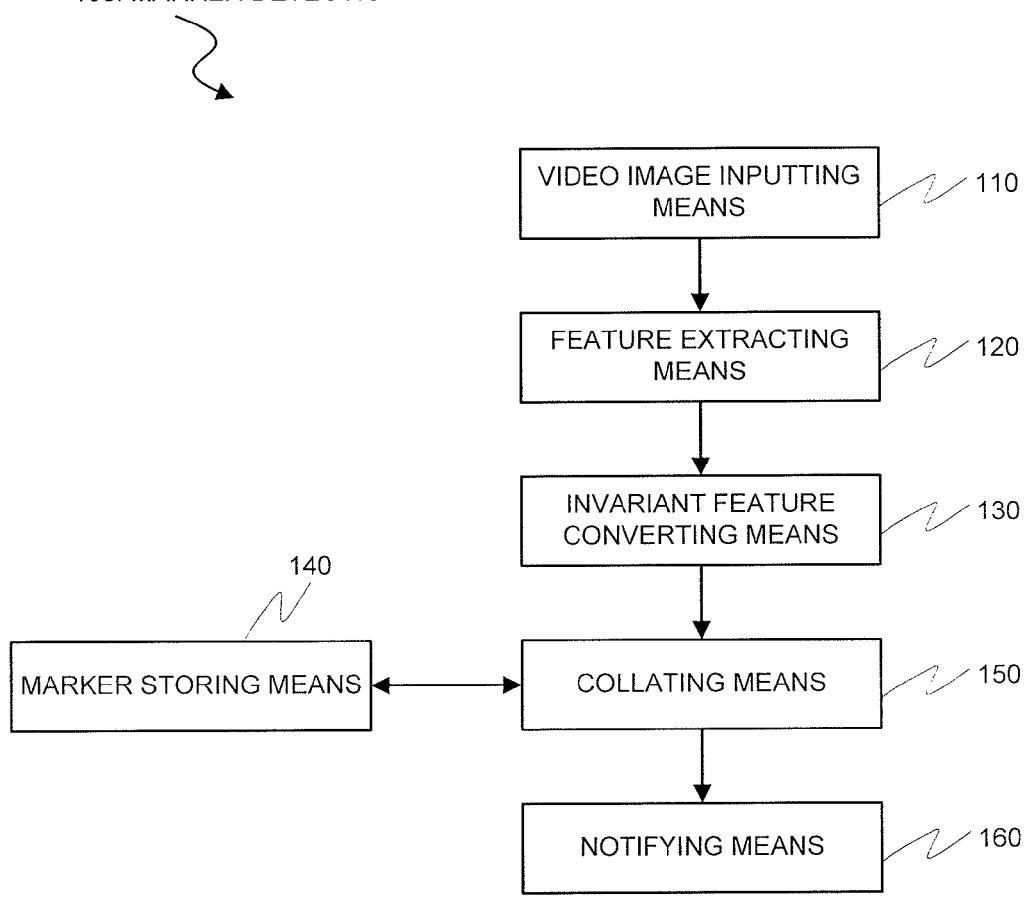
FIG. 30 is a block diagram illustrating a configuration of the marker detection device.

FIG. 30 is a block diagram illustrating a configuration of the marker detection device.

Figure 31:
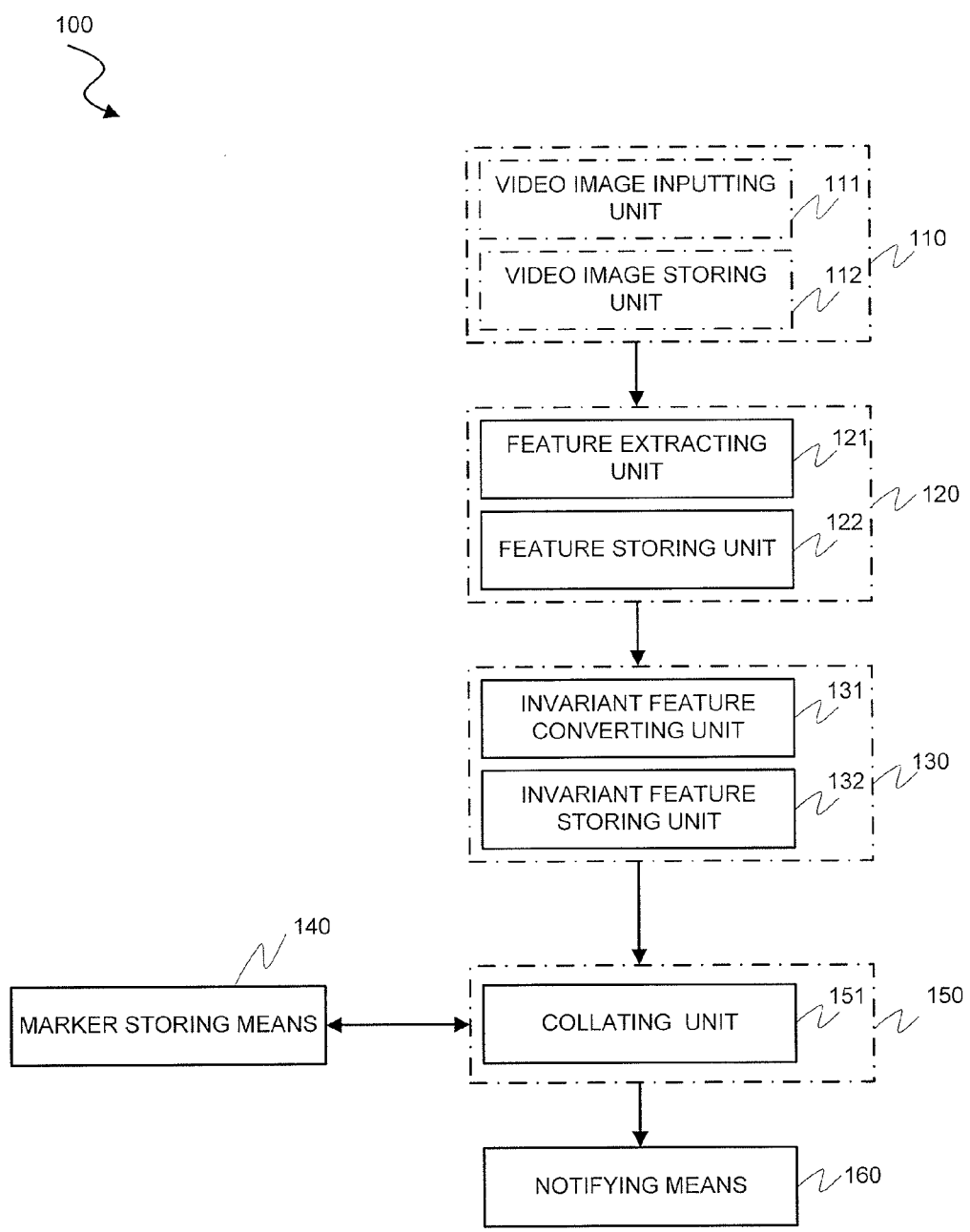
FIG. 31 is a block diagram illustrating a detailed configuration of the marker detection device.

Further, FIG. 31 is a block diagram illustrating a detailed configuration of the marker detection device.

As shown in FIG. 30, a marker detection device 100 is provided with a video image inputting means 110, a feature extracting means 120, an invariant feature converting means 130, a marker storing means 140, a collating means 150, and a notifying means 160.

The video image inputting means 110 includes a video image inputting unit 111 and a video image storing unit 112 as shown in FIG. 31.

The video image inputting unit 111 inputs the background image of the location in which the marker is actually used.

Figure 32:
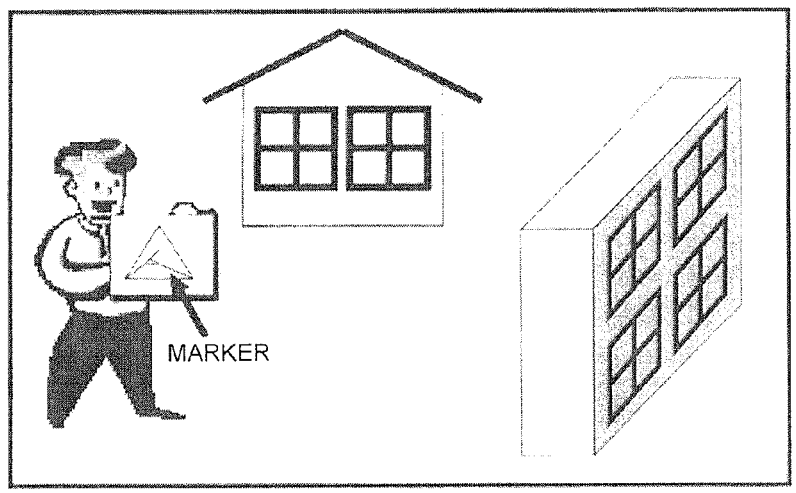
FIG. 32 is a view illustrating an example of the to-be-detected target.

For example, as shown in FIG. 32, the video image inputting unit 111 inputs the background image containing the marker.

The video image storing unit 112 stores the inputted background images as a digitalized frame image.

The feature extracting means 120 includes a feature extracting unit 121 and a feature storing unit 122 as shown in FIG. 31.

The feature extracting unit 121 takes out the frame images from the video image storing unit 112.

Figure 33:
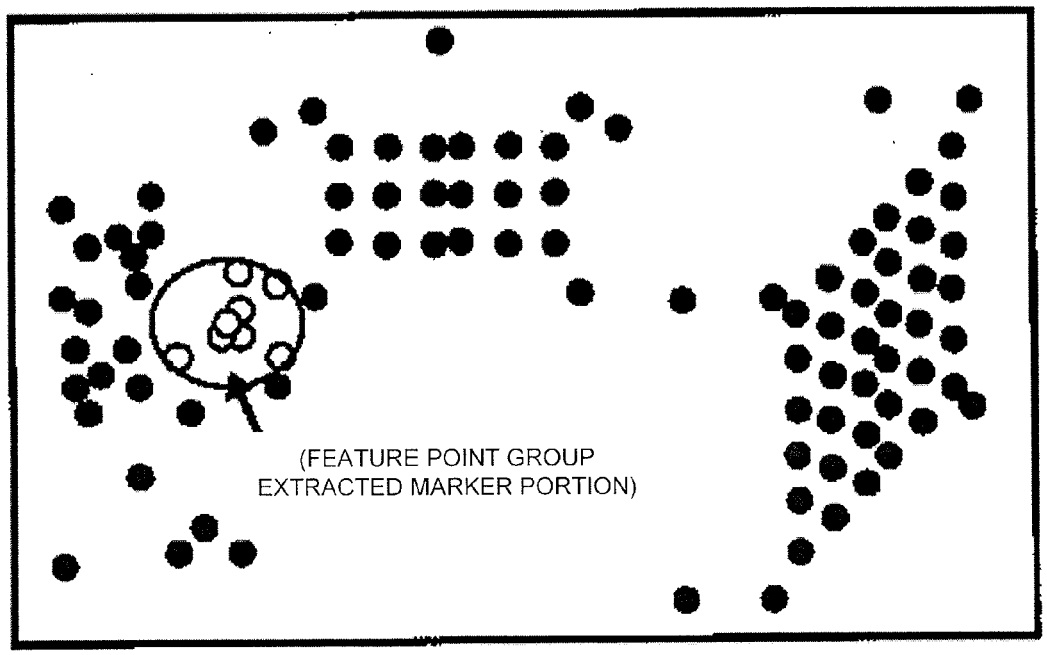
FIG. 33 is a view illustrating an example of the feature points extracted from the detection-targeted video image.

And, the feature extracting unit 121 extracts the image features containing a characteristic pattern in the taken-out frame image. For example, when the frame image is an image shown in FIG. 32, the feature extracting unit 121 extracts the feature points shown in FIG. 33 from the above frame image.

The feature storing unit 122 stores each of the coordinates of the feature points extracted by the feature extracting unit 121.

The invariant feature converting means 130 includes an invariant feature converting unit 131 and an invariant feature storing unit 132 as shown in FIG. 31.

The invariant feature converting unit 131 takes out the coordinates of the feature points from the feature storing unit 122, and maps these feature points onto the invariant feature space. Additionally, the invariant feature converting unit 131 performs the aforementioned mapping process based upon the basis having the number identical to the basis number at the time of generating the marker that is to be detected. For this, the invariant feature converting unit 131 takes out the basis number employed at the time of generating the existing marker previously stored in the marker storing means 150, and performs the mapping process based upon the basis having the number identical to this taken-out basis number.

Further, the invariant feature converting unit 131 divides the invariant feature space into a plurality of the segments by using the grid-type mesh cells.

The invariant feature storing unit 132 stores various items of data obtained by the invariant feature converting unit 131. Various items of data contain, for example, the coordinate of each invariant feature arranged in the invariant feature space, the coordinate (scope) of each segment, and the like.

The marker storing means 140 stores information related to the marker that is to be detected.

Further, the marker storing means 140 stores the basis number employed at the time of generating the above marker pattern. Specifically, the marker storing means 140 stores any of the numerical values of 1 to 3, being the basis number employed at the moment of the invariant feature conversion process, as the marker-related information.

The collating means 150 includes a collating unit 151 as shown in FIG. 31.

The collating unit 151 takes out each of the coordinates of invariant feature groups that are founded upon the detection-targeted video images, from the invariant feature storing unit 132, takes out the marker pattern from the marker storing unit 142, and collates them.

And, the collating unit 151 determines whether or not the invariant feature matching with the marker pattern is detected from the invariant feature group that is founded upon the detection-targeted video images.

Specifically, when the invariant feature founded upon the detection-targeted video image has been projected even once onto a mesh cell having a frequency of zero at the time of designing the marker, the collating unit 151 regards it as contribution from the marker pattern to confirm the detection, whereby the marker detection can be quickly carried out. For example, as shown in FIG. 34 (a), the collating unit 151 confirms the marker detection when the invariant feature, being the detection-targeted video image, has been plotted onto even one of the predetermined coordinate positions of the marker patterns. On the other hand, as shown in FIG. 34 (b), the collating unit 151 determines that no marker has been detected when none of the invariant feature has been plotted onto the predetermined coordinate positions of the marker patterns.

Additionally, so as to avoid the erroneous detection of the marker due to noise or an error in the feature extraction calculation, the frequency of the projection to be acknowledged may be defined as a predetermined value of one or more.

Further, the collating unit 151 sends out a notification signal to the notifying means 160 responding to a result of the collation. Specifically, the collating unit 151 sends out the notification signal when the invariant feature matching with the marker pattern is detected from the invariant feature group based upon the detection-targeted video image.

Upon receipt of the notification signal from the collating unit 151, the notifying means 160 notifies the outside that the invariant features have been plotted onto the predetermined coordinate positions of the unique features of the marker pattern, that is, that the marker has been detected. As a method of this notification, for example, there exists a voice output, a screen display, or the like.

(The Marker Detection Method)

Figure 35:
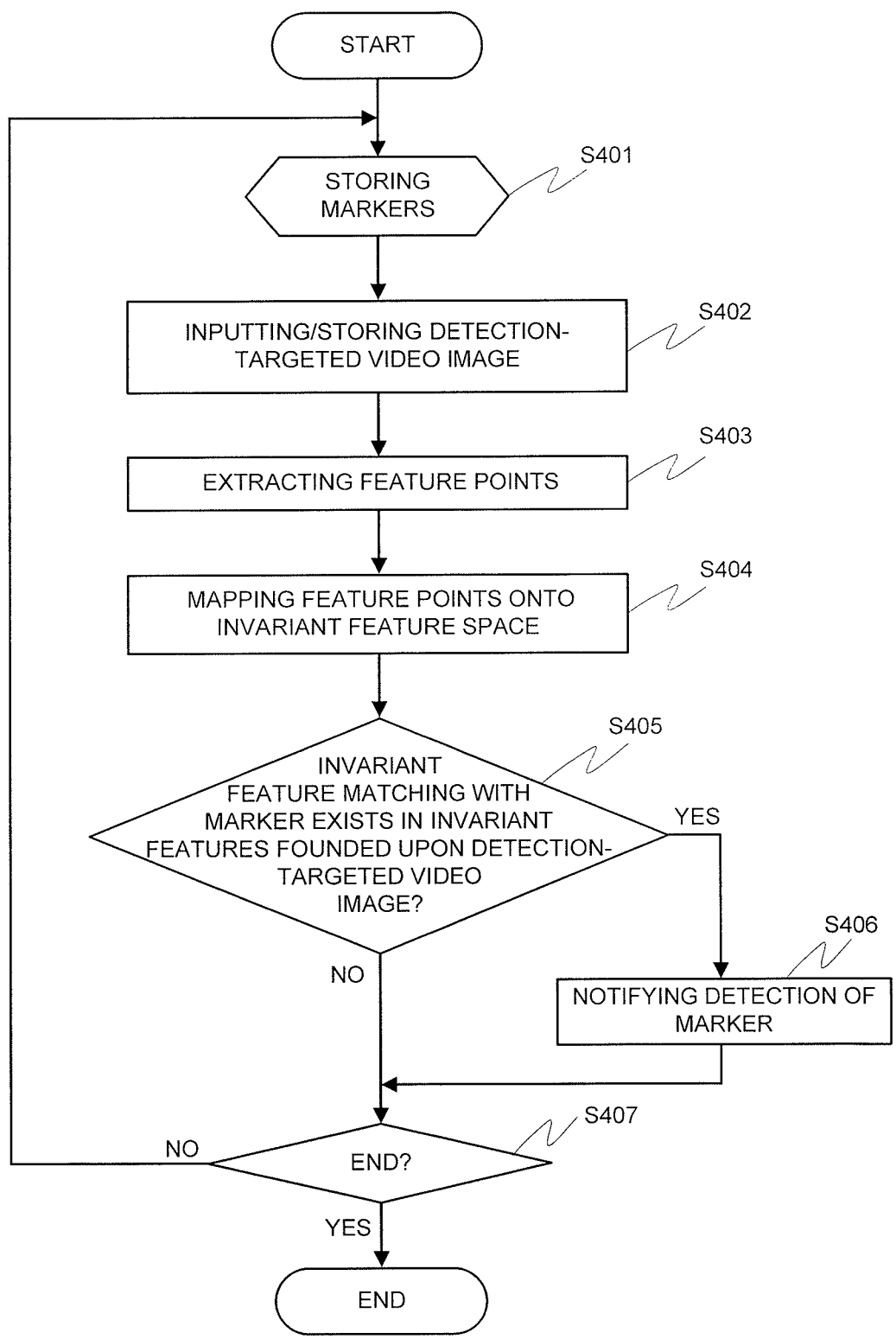
FIG. 35 is a flowchart illustrating a procedure of the marker detection method.

Next, the marker detection method of this exemplary embodiment will be explained by making a reference to FIG. 35.

The marker storing means 140 stores data related to the markers beforehand (Step 401). Specifically, the marker storing means 140 stores the marker patterns generated by the marker generation devices 1a to 1c. Further, the marker storing means 140 stores the basis numbers employed for the invariant feature conversion performed as a pre-process of generating the above marker patterns.

Herein, the video image inputting unit 111 of the video image inputting means 110 inputs the background image (containing the marker) of the location in which the marker is actually used (Step 402).

The video image storing unit 112 stores the inputted background image as the digitalized frame image.

Next, the feature extracting unit 121 of the feature extracting means 120 takes out the frame images from the video image storing unit 112. And, the feature extracting unit 121 extracts the feature points from the taken-out frame images (Step 403). The feature storing unit 122 stores each coordinate of the feature point extracted by the feature extracting unit 121.

Continuously, the invariant feature converting unit 131 of the invariant feature converting means 130 takes out the feature points from the feature storing unit 122, and maps each feature point onto the invariant feature space based upon the basis numbers stored in the marker storing means 140 (Step 404). The invariant feature storing unit 132 stores the coordinates of the feature points (invariant features) mapped onto the invariant feature space.

Next, the collating unit 151 of the collating means 150 tries to detect the invariant feature matching with the marker pattern from the invariant feature group based upon the detection-targeted video image, mapped onto the invariant feature space (Step 405).

When as a result of this collation, the invariant feature matching with the marker pattern has been detected from the invariant feature group based upon the detection-targeted video image mapped onto the invariant feature space (Step 405: YES), the notifying means 160 notifies the outside that the marker has been detected (Step 406).

Thereafter, a determination as to whether or not to terminate the operation is made (Step 407), and processes of the Step 401 to the Step 407 are repeated when the operation is not terminated.

As explained above, the marker detection device and the marker detection method of this exemplary embodiment enable the marker reflected onto the detection-targeted video image, to be surely detected by employing the marker patterns generated by the marker generating device.

[The Marker Generation Detection Device and the Marker Generation Detection System]

(The Marker Generation Detection Device)

Next, the marker generation detection device will be explained by making a reference to FIG. 36.

Figure 36:
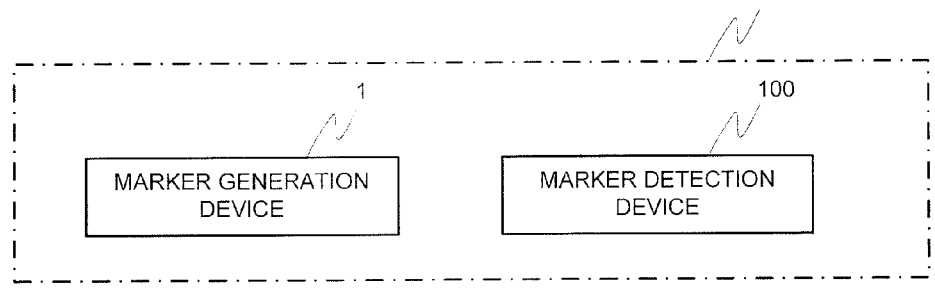
FIG. 36 is a block diagram illustrating a configuration of the marker generation detection device.

FIG. 36 is a block diagram illustrating a configuration of the marker generation detection device.

As shown in FIG. 36, a marker generation detection device 1000 is provided with a marker generation device 1 and a marker detection device 100.

Herein, as the marker generation device 1, any of the marker generation devices of the first exemplary embodiment to the third exemplary embodiment described before may be employed.

Further, as the marker detection device 100, the marker detection device 100 shown in FIG. 30 described before may be employed.

In such a manner, the marker generation detection device 1000 may assume a configuration in which the marker generation device 1 and the marker detection device 100 are unified.

Figure 37:
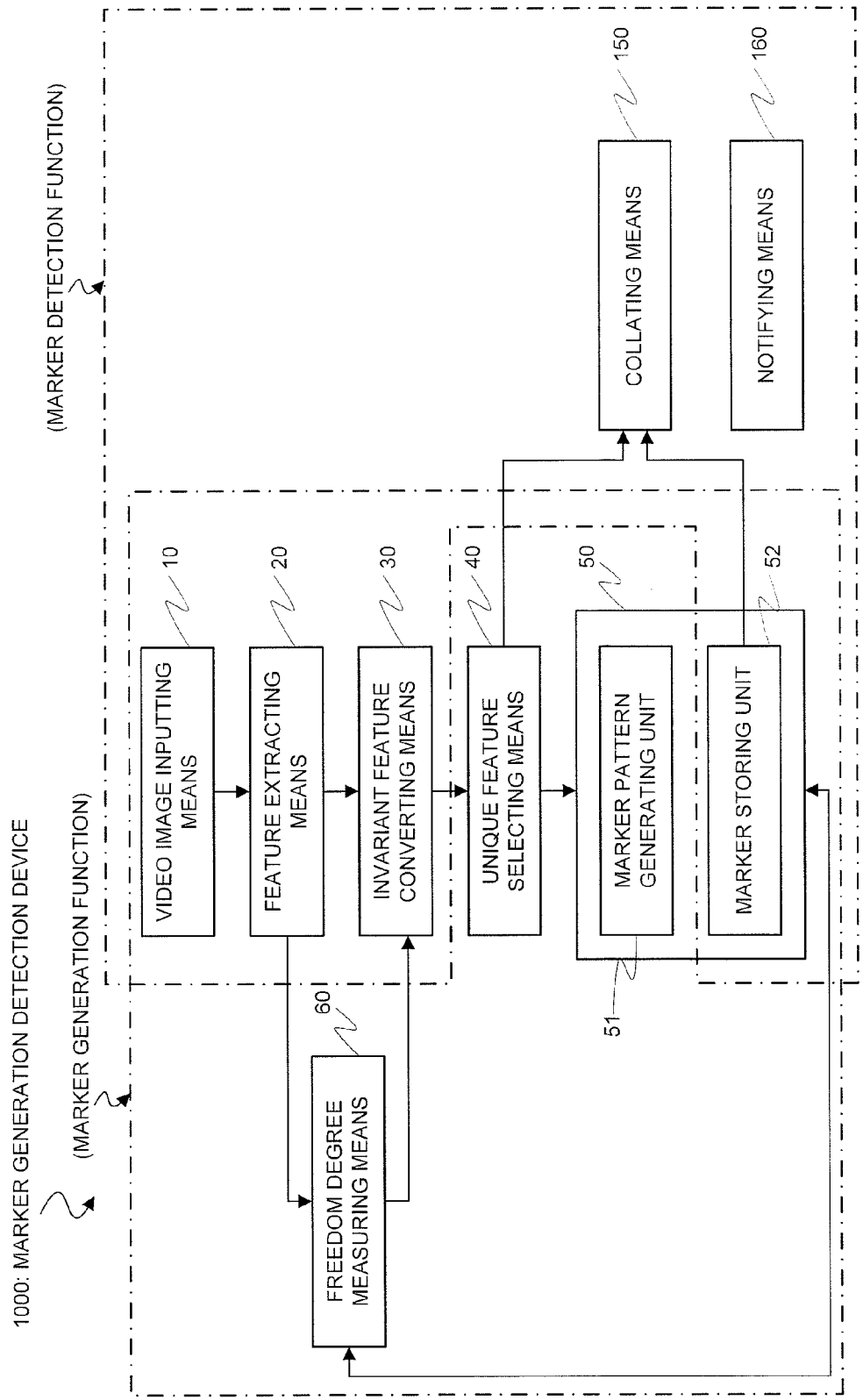
FIG. 37 is a block diagram illustrating a detailed configuration of the marker generation detection device.

Further, the marker generation detection device 1000 may assume a configuration as shown in FIG. 37 because the marker generation device 1 and the marker detection device 100 include a function that can be shared.

For example, the marker generation detection device 1000 includes a video image inputting means 10, a feature extracting means 20, an invariant feature converting means 30, a unique feature selecting means 40, a marker generating means 50, a freedom degree measuring means 60, a collating means 150, and a notifying means 160.

The video image inputting means 10, the feature extracting means 20, the invariant feature converting means 30, the unique feature selecting means 40, the marker generating means 50, and the freedom degree measuring means 60, out of them, include a function as the marker generation device, respectively.

On the other hand, the video image inputting means 10, the feature extracting means 20, the invariant feature converting means 30, a marker storing unit 52, the collating means 150, and the notifying means 160 include a function as the marker detection device, respectively.

And, the video image inputting means 10, the feature extracting means 20, the invariant feature converting means 30, and the marker storing unit 52 are portions that are common in the marker generation device and the marker detection device.

The marker generation method in the marker generation device is similar to the marker generation method in the first exemplary embodiment to the third exemplary embodiment described before.

Further, the marker detection method in the marker detection device is similar to the marker detection method in the exemplary embodiments described before.

(The Marker Generation Detection System)

Next, the marker generation detection system of this exemplary embodiment will be explained by making a reference to FIG. 38. As shown in the same figure, a marker generation detection system 2000 is provided with a marker generation device 1 and a marker detection device 100. These marker generation device 1 and marker detection device 100 may be connected to each other via a communication network, a communication cable 300, or the like.

The marker generation device 1 includes a video image inputting means 10, a feature extracting means 20, an invariant feature converting means 30, a unique feature selecting means 40, a marker generating means 50, a freedom degree measuring means 60, and a communicating means 70.

The communicating means 70 takes out data (the marker pattern and the basis number employed for generating the above marker) related to the markers stored in the marker generating means 50, and transmit it to the marker detection device 100.

The marker detection device 100 includes a video image inputting means 110, a feature extracting means 120, an invariant feature converting means 130, a marker storing means 140, a collating means 150, a notifying means 160, and a communicating means 170.

The communicating means 170 receives the data related to the marker transmitted from the marker generation device 1. Further, the communicating means 170 causes the marker storing means 140 to store the above data related to the marker.

As explained above, in accordance with the marker generation detection device and the marker detection system, the marker generation detection device or the marker generation function of the marker generation detection system is capable of obtaining the unique features on top of obtaining the basis number responding to the freedom degree (the postural change) of the marker detection environment and mapping the feature points onto the invariant feature based upon the basis having the above basis number, and on top thereof, generating the markers.

This enables the system having the marker generation function and the marker detection function unified therein to be provided.

[The Marker Generation Program and the Marker Detection Program]

Next, the marker generation program and the marker detection program will be explained.

The marker generation function (function of executing the marker generation method) and the marker detection function (function of executing the marker detection method) of a computer (the marker generation device, the marker detection device, the marker generation detection device, and the marker detection system) in the above-mentioned each exemplary embodiment are realized with the marker generation program or the marker detection program stored in the storing means (for example, ROM (Read Only Memory), a hard disk, or the like).

The marker generation program and the marker detection program, which are loaded into a controlling unit (CPU (Central Processing Unit) etc.) of the computer, send a command to each of the components of the computer, and cause the components of the computer to execute predetermined processes, for example, the video image input process, the feature extraction process, the invariant feature conversion process, the unique feature selection process, the marker generation process and the freedom degree measurement process of the marker generation device as well as the video image input process, the feature extraction process, the invariant feature conversion process, the collation process, and the notification process of the marker detection device, and the like.

With this, the configuring means of the marker generation program, being software, and the computer (the marker generating means (the marker generation device, a marker generation server, a marker generation network, the marker generation system, and the like)), being the hardware resource, cooperate with each other, thereby allowing the marker generation function and the marker detection function to be realized.

Additionally, the marker generation program for realizing the marker generation function and the marker detection function is stored in ROM and a hard disk of the computer, and the like, and besides, it may be filed in computer-readable recording mediums, for example, an external storage device and a portable recording medium.

The so-called external storage device could be a memory expansion device that has the recording medium such as CD-ROM (Compact Disc-Read Only Memory) built-in therein and is externally connected to the marker generation device. On the other hand, the so-called portable recording medium is a recording medium that is installable into a recording medium driving device (driving device) and yet is portable, and for example, could be a flexible disc, a memory card, an optical magnetic disc, and the like.

And, the program recorded in the recording medium is loaded into RAM (Random Access Memory) of the computer or the like, and is executed by CPU (controlling means). This execution allows the function of the marker generation device of each exemplary embodiment described above to be realized.

In addition, when the marker generation program is loaded by the computer, the marker generation program kept by other computers may be downloaded into RAM or an external storage device, which the above computer includes, by utilizing a communication line. This downloaded marker generation program is also executed by CPU, and the marker generation function of the marker generation device of each of the above-mentioned exemplary embodiments is realized.

As explained above, in accordance with the marker generation device, the marker generation detection system, the marker generation detection device, the marker, the marker generation method, and the marker generation program of this exemplary embodiment, it can be avoided to erroneously determine that the desired object actually not existing exists within its space.

Further, generating the marker responding to the things to be detected such as the object and the marker and the postural change of the use environment thereof enables a reasonable harmony between the load of the marker generation and the precision of the marker detection to be realized.

That is, when the postural change is not large, making the basis number to be set small enables the load of the processes associated with the marker generation to be alleviated.

Further, when the postural change is large, making the basis number to be set large enables the precision of the marker detection to be enhanced.

Further, the content of the above-mentioned exemplary embodiments can be expressed as follows.

(Supplementary note 1) A marker generation device comprising:

a measuring means that measures, based upon a background image, postural changes of an object within this image;

an invariant feature converting means that displays feature points extracted from said background images onto an invariant feature space with a predetermined conversion process responding to said postural changes;

a unique feature selecting means that selects as a unique feature a portion of said invariant feature space in which said feature point does not appear; and a marker generating means that generates a marker by employing said unique features.

(Supplementary note 2) A marker generation device according to Supplementary note 1, comprising:

a video image inputting means that inputs the background images; and a feature extracting means that extracts the feature points from said inputted background images:

wherein said measuring means comprises a basis number setting unit that measures the kinds of the postural changes of the object within this image based upon said inputted background images, and decides the number of corresponding reference points responding to said kinds of the postural changes;

wherein said invariant feature converting means displays, as said predetermined conversion process, each feature point extracted from said background images onto the invariant feature space with a mapping process employing said decided number of the reference points;

wherein said unique feature selecting means selects as the unique feature a portion of said invariant feature space in which said feature point does not appear; and wherein said marker generating means generates the marker by employing said unique features.

(Supplementary note 3) A marker generation device according to Supplementary note 2:

wherein said measuring means measures one of translation, expansion, reduction, rotation and shear deformation, or a combination thereof as said kind of the postural change; and wherein said basis number setting unit decides, as said kind of the postural change, said number of the reference points to be one (1) when only the translation is measured, decides said number of the reference points to be two when one postural change or more of the expansion, the reduction, and the rotation is measured, or the postural change of a combination of the above postural change and the translation is measured, and decides said number of the reference points to be three when the shear deformation is measured, or the postural change of a combination of the shear deformation and one or more of the translation, the expansion, the reduction, and the rotation is measured.

(Supplementary note 4) A marker generation device according to Supplementary note 2 or Supplementary note 3:

wherein said feature extracting means comprises a feature extracting unit that extracts positional information of said feature points;

wherein said video image inputting means inputs two or more corresponding background images each having a different time; and wherein said measuring means measures said kind of the postural change based upon a positional change of the feature points extracted form said two or more background images.

(Supplementary note 5) A marker generation device according to one of Supplementary note 2 to Supplementary note 4, wherein said measuring means comprises:

a basis number calculating unit that calculates said number of the reference points responding to the kind of the postural change measured by said measuring means; and a basis number determining unit that determines whether a first reference point number calculated above, responding to a process of said basis number calculating unit, matches with a second reference point number associated with a reference employed in said conversion process at the time of previously generating the marker:

wherein said basis number setting unit decides said first reference point number to be the number of the reference points that is employed for said conversion process when it is determined that said first reference point number does not match with said second reference point number; and wherein said invariant feature converting unit executes the mapping process employing said first reference point number.

(Supplementary note 6) A marker generation device according to Supplementary note 5, wherein when it is determined that said first reference point number matches with said second reference point number, said invariant feature converting means stops execution of said predetermined conversion process until a mismatch of these reference point numbers is determined thereafter.

(Supplementary note 7) A marker generation device according to one of Supplementary note 2 to Supplementary note 6, wherein said basis number setting unit decides said number of the reference points to be one of 1 to 3 responding to an input maneuver.

(Supplementary note 8) A marker generation detection system comprising a marker generation device and a marker detection device:

wherein said marker generation device comprises:
a measuring means that measures, based upon a background image, postural changes of an object within this image;
an invariant feature converting means that displays feature points extracted from said background images onto an invariant feature space with a predetermined conversion process responding to said postural changes;
a unique feature selecting means that selects as a unique feature a portion of said invariant feature space in which said feature point does not appear; and
a marker generating means that generates a marker by employing said unique features; and
wherein said marker detection device comprises:
a marker storing means that stores said generated markers; and
a collating means that determines whether or not an arrangement of said unique feature of the marker exists in an arrangement of an invariant feature group for displaying the feature points extracted from the background images for detecting said markers onto said invariant feature space.

(Supplementary note 9) A marker generation detection system according to Supplementary note 8:

wherein said marker generation device comprises:
a video image inputting means that inputs the background images and
a feature extracting means that extracts the feature points from said inputted background images:

wherein said measuring means comprises a basis number setting unit that measures the kinds of the postural changes of the object within this image based upon said inputted background images, and decides the number of corresponding reference points responding to said kinds of the postural changes;

wherein said invariant feature converting means displays, as said predetermined conversion process, each feature point extracted from said background images onto the invariant feature space with a mapping process employing said decided number of the reference points;

wherein said unique feature selecting means selects as the unique feature a portion of said invariant feature space in which said feature point does not appear; and wherein said marker generating means generates the marker by employing said unique features.

(Supplementary note 10) A marker generation detection device comprising:

a measuring means that measures, based upon a background image, postural changes of an object within this image;

an invariant feature converting means that displays feature points extracted from said background images onto an invariant feature space with a predetermined conversion process responding to said postural change;

a unique feature selecting means that selects as a unique feature a portion of said invariant feature space in which said feature point does not appear; and a marker generating means that generates a marker by employing said unique features;

a marker storing means that stores said generated markers; and a collating means that determines whether or not an arrangement of said unique feature of the marker exists in an arrangement of an invariant feature group for displaying the feature points extracted from the background images for detecting said markers onto said invariant feature space.

(Supplementary note 11) A marker generation detection device according to Supplementary note 10, comprising:

a video image inputting means that inputs the background images; and a feature extracting means that extracts the feature points from said inputted background images;

wherein said measuring means comprises a basis number setting unit that measures the kinds of the postural changes of the object within this image based upon said inputted background images, and decides the number of corresponding reference points responding to said kinds of the postural changes:

wherein said invariant feature converting means displays, as said predetermined conversion process, each feature point extracted from said background images onto the invariant feature space with a mapping process employing said decided number of the reference points;

wherein said unique feature selecting means selects as the unique feature a portion of this invariant feature space in which said feature point does not appear; and wherein said marker generating means generates the marker by employing this unique feature.

(Supplementary note 12) A marker generated by employing, in an invariant feature space onto which feature points of a background image are displayed with a predetermined conversion process responding to a postural change to be measured from this image, a portion in which said feature point does not appear.

(Supplementary note 13) A marker according to Supplementary note 12, said marker generated by employing, in the invariant feature space onto which the feature points of the background image are displayed with a mapping process employing a reference point of which the number is decided responding to a kind of said postural change, a portion in which said feature point does not appear.

(Supplementary note 14) A marker generation method comprising the steps of:

measuring, based upon a background image, postural changes of an object within this image;

displaying feature points extracted from said background images onto an invariant feature space with a predetermined conversion process responding to said postural changes;

selecting as a unique feature a portion of said invariant feature space in which said feature point does not appear; and generating a marker by employing said unique features.

(Supplementary note 15) A marker generation method according to Supplementary note 14, comprising the steps of:

inputting the background images;

extracting the feature points from said inputted background images;

measuring the kinds of the postural changes of the object within this image based upon said inputted background images, and deciding the number of corresponding reference points responding to these kinds of the postural changes;

displaying, as said predetermined conversion process, each feature point extracted from said background images onto the invariant feature space with a mapping process employing said decided number of the reference points;

selecting as the unique feature a portion of said invariant feature space in which said feature point does not appear; and generating the marker by employing said unique features.

(Supplementary note 16) A marker generation program for causing an information processing device to function as:

a means that measures, based upon a background image, postural changes of an object within this image;

a means that displays feature points extracted from said background images onto an invariant feature space with a predetermined conversion process responding to said postural changes;

a means that selects as a unique feature a portion of said invariant feature space in which said feature point does not appear; and a means that generates a marker by employing said unique features.

(Supplementary note 17) A marker generation program according to Supplementary note 16, said marker generation program causing said information processing device to function as:

a means that inputs the background images;

a means that extracts the feature points from said inputted background images;

a means that measures the kinds of the postural changes of the object within this image based upon said inputted background images, and decides the number of corresponding reference points responding to these kinds of the postural changes;

a means that displays, as said predetermined conversion process, each feature point extracted from said background images onto the invariant feature space with a mapping process employing said decided number of the reference points;

a means that selects as the unique feature the portion of said invariant feature space in which said feature point does not appear; and a means that generates the marker by employing said unique features.

Above, although the present invention of the marker generation device, the marker generation detection system, the marker generation detection device, the marker, the marker generation method, and the marker generation program have been particularly described with reference to the preferred embodiments, it should be readily apparent to those of ordinary skill in the art that the present invention is not always limited to the above-mentioned embodiment, and changes and modifications in the form and details may be made without departing from the spirit and scope of the invention.

For example, in the above embodiments, the marker generation device generates a marker. However, the marker generation device can also generate markers.

This application is based upon and claims the benefit of priority from Japanese patent application No. 2009-171837, filed on Jan. 23, 2009, the disclosure of which is incorporated herein in its entirety by reference.

INDUSTRIAL APPLICABILITY

The present invention is an invention relating to generation of a marker, and may be applied to fields for devices or appliances for generating a marker. Besides, the present invention may also be applied for fields of video image monitoring such as those represented by article management and physical security, robot vision, mixed reality UI, and content generation.

REFERENCE SIGNS LIST 1 marker generation device
10 video image inputting means
20 feature extracting means
30 invariant feature converting means
40 unique feature converting means
50 marker generating means
60 freedom degree measuring means
61 freedom degree detecting unit
62 basis number setting unit
63 basis number calculating unit
64 basis number determining unit
100 marker detection device
1000 marker generation detection device
2000 marker generation detection system

The invention claimed is:

1. A marker generation device comprising:
a video image inputting unit configured to input at least one background image;
a measuring unit configured to measure, based upon the background image, postural changes of an object within this image;
a feature extracting unit configured to extract feature points from said inputted background images;
an invariant feature converter configured to display the feature points extracted from said at least one background image onto an invariant feature space with a predetermined conversion process responding to said postural changes;

a unique feature selector configured to select as a unique feature a portion of said invariant feature space in which said feature point does not appear; and a marker generating means configured to generate a marker by employing said unique features:

wherein said measuring unit comprises a basis number setting unit configured to measure the kinds of the postural changes of the object within this image based upon said inputted background images, and decide the number of corresponding reference points responding to said kinds of the postural changes;

wherein:
said invariant feature converter is configured to display, as said predetermined conversion process, each feature point extracted from said at least one background image onto the invariant feature space with a mapping process employing said decided number of reference points;

said unique feature selector is configured to select as the unique feature a portion of said invariant feature space in which said feature point does not appear; and said marker generator is configured to generate the marker by employing said unique features.

2. A marker generation device according to claim 1, wherein:
said measuring unit is configured to measure one of translation, expansion, reduction, rotation and shear deformation, or a combination thereof as said kind of the postural change; and said basis number setting unit is configured to decide, as said kind of the postural change:
said number of the reference points to be one (1) when only the translation is measured, said number of the reference points to be two when one postural change or more of the expansion, the reduction, and the rotation is measured, or the postural change of a combination of the above postural change and the translation is measured, and said number of the reference points to be three when the shear deformation is measured, or the postural change of a combination of the shear deformation and one or more of the translation, the expansion, the reduction, and the rotation is measured.

3. A marker generation device according to claim 1, wherein:
said at least one background image comprises a plurality of background images;

said feature extracting unit comprises a feature extracting unit configured to extract positional information of said feature points;

said video image inputting unit is configured to input two or more corresponding background images of the plurality of background images, each having a different time; and said measuring unit is configured to measure said kind of the postural change based upon a positional change of the feature points extracted from said two or more corresponding background images.

4. A marker generation device according to claim 1, wherein said measuring unit comprises:
a basis number calculating unit configured to calculate said number of the reference points responding to the kind of the postural change measured by said measuring unit; and a basis number determining unit configured to determine whether a first reference point number calculated above, responding to a process of said basis number calculating unit, matches with a second reference point number associated with a reference employed in said conversion process at the time of previously generating the marker;

wherein said basis number setting unit is configured to decide said first reference point number to be the number of the reference points that is employed for said conversion process when it is determined that said first reference point number does not match with said second reference point number; and wherein said invariant feature converting unit is configured to execute the mapping process employing said first reference point number.

5. A marker generation device according to claim 4, wherein, when it is determined that said first reference point number matches with said second reference point number, said invariant feature converter is configured to respond by stopping execution of said predetermined conversion process until a mismatch of these reference point numbers is thereafter determined.

6. A marker generation device according to claim 1, wherein said basis number setting unit is configured to decide said number of the reference points to be in the range from 1 to 3, inclusive, responding to an input maneuver.

7. A marker generation detection system comprising:
a marker generation device, and a marker detection device;
wherein said marker generation device comprises:
a measuring unit configured to measure, based upon one or more background images, postural changes of an object within the one or more background images;

an invariant feature converter configured to display feature points extracted from said one or more background images onto an invariant feature space with a predetermined conversion process responding to said postural changes;

a unique feature selector configured to select as a unique feature a portion of said invariant feature space in which said feature point does not appear; and a marker generator configured to generate a marker by employing said unique features; and wherein said marker detection device comprises:
a marker storage configured to store said generated markers; and a collating unit configured to determine whether or not an arrangement of said unique feature of the marker exists in an arrangement of an invariant feature group for displaying the feature points extracted from the one or more background images for detecting said markers onto said invariant feature space.

8. A marker generation detection system according to claim 7:
wherein said marker generation device comprises:
a video image inputting unit configured to input the one or more background images and a feature extracting unit that extracts the feature points from said inputted one or more background images:

wherein said measuring unit comprises a basis number setting unit configured to:
measure the kinds of the postural changes of the object within this image based upon said inputted background images, and decide the number of corresponding reference points responding to said kinds of the postural changes;

wherein said invariant feature converter is configured to display, as said predetermined conversion process, each feature point extracted from said one or more background images onto the invariant feature space with a mapping process employing said decided number of the reference points;

wherein said unique feature selector is configured to select as the unique feature a portion of said invariant feature space in which said feature point does not appear; and wherein said marker generator is configured to generate the marker by employing said unique features.

9. A marker generation detection device comprising:
a measuring unit configured to measure, based upon a background image, postural changes of an object within this image;
an invariant feature converter configured to display feature points extracted from said one or more background images onto an invariant feature space with a predetermined conversion process responding to said postural change;
a unique feature selector configured to select as a unique feature a portion of said invariant feature space in which said feature point does not appear;
a marker generator configured to generate a marker by employing said unique features;
a marker storage configured to store said generated markers; and
a collating unit configured to determine whether or not an arrangement of said unique feature of the marker exists in an arrangement of an invariant feature group for displaying the feature points extracted from the background images for detecting said markers onto said invariant feature space.

10. A marker generation detection device according to claim 9, comprising:
a video image inputting unit configured to input the one or more background images; and
a feature extracting unit configured to extract the feature points from said inputted one or more background images;
wherein said measuring unit comprises a basis number setting unit configured to:
  measure the kinds of the postural changes of the object within this image based upon said inputted background images, and
  decide the number of corresponding reference points responding to said kinds of the postural changes:
wherein said invariant feature converter is configured to display, as said predetermined conversion process, each feature point extracted from said one or more background images onto the invariant feature space with a mapping process employing said decided number of the reference points;

wherein said unique feature selector is configured to select as the unique feature a portion of this invariant feature space in which said feature point does not appear; and wherein said marker generator is configured to generate the marker by employing this unique feature.

11. A marker generation method comprising:
inputting one or more background images;
extracting the feature points from said inputted one or more background images;
measuring the kinds of the postural changes of the object within the one or more background images based upon said inputted one or more background images, and deciding the number of corresponding reference points responding to the postural changes;
displaying, as said predetermined conversion process, each feature point extracted from said one or more background images onto the invariant feature space with a mapping process employing said decided number of the reference points;
selecting as a unique feature a portion of said invariant feature space in which said feature point does not appear; and
generating a marker by employing said unique features.

12. A non-transitory computer readable storage medium storing a marker generation program adapted to enable an information processing device to implement operations, comprising:
inputting the background images;
extracting the feature points from said inputted background images;
inputting the postural changes of the object within at least one of the background images based upon said inputted background images, and deciding the number of corresponding reference points responding to these kinds of the postural changes;
displaying, as said predetermined conversion process, each feature point extracted from said background images onto the invariant feature space with a mapping process employing said decided number of the reference points;
selecting as the unique feature the portion of said invariant feature space in which said feature point does not appear; and
generating the marker by employing said unique features.

* * * * *